United States Patent [19]

Moore et al.

[11] Patent Number: 4,546,430
[45] Date of Patent: Oct. 8, 1985

[54] CONTROL UNIT BUSY QUEUING

[75] Inventors: David J. Moore, Ramsey County; Larry L. Byers, Dakota County; Duane G. Kurth, Anoka County; Donald T. Bordsen; John R. Honkomp, both of Ramsey County; Bruce C. Todd, Anoka County; Robert M. Malek, Ramsey County, all of Minn.

[73] Assignee: Sperry Corporation, New York, N.Y.

[21] Appl. No.: 513,051

[22] Filed: Jul. 13, 1983

[51] Int. Cl.[4] ............................................. G06F 3/00
[52] U.S. Cl. .................................................... 364/200
[58] Field of Search ........................ 364/200, 300, 900

[56] References Cited

U.S. PATENT DOCUMENTS

| T926,012 | 9/1974 | Blackwell et al. | 364/300 X |
| T940,019 | 11/1975 | Larson | 364/300 |
| 4,208,714 | 6/1980 | Eklund et al. | 364/200 |
| 4,224,667 | 9/1980 | Lewis et al. | 364/200 |
| 4,394,733 | 7/1983 | Swenson | 364/200 |
| 4,435,755 | 3/1984 | Meritt | 364/200 |

Primary Examiner—James D. Thomas
Assistant Examiner—David L. Clark
Attorney, Agent, or Firm—Griffin, Branigan & Butler

[57] ABSTRACT

In a system wherein a central computer complex is connected through central control modules (CCM) and channel modules (CM) to the control units of peripheral subsystems, a first queue is maintained in a CCM for Start I/O Fast (SIOF) commands waiting to be accepted by the CMs connected thereto. After a CM accepts an SIOF command and passes it on to a control unit, the control unit may return to the CM a busy status which is then passed through to the CCM. The CCM maintains a control unit busy (CUB) queue and an entry is made therein when busy status is returned. When a control unit reports control unit end status to the CCM, the CUB queue is linked to the top of the SIOF so that the CMs may again be informed that the SIOF commands are available. The arrangement avoids two interruptions of the central computer complex to report first that the control unit is busy and then that the control unit is available.

7 Claims, 43 Drawing Figures

| 0 | 7 8 | | 43 |
|---|---|---|---|
| EXT D 00-07 | | ACM D 00-35 | |

FIG. 8A     ACM D FORMAT

| 0 | 1 2 | 25 | 28 | 43 |
|---|---|---|---|---|
| ACMD 06-07 | ACM D 12-35 | | CS CONSTANT 00-15 | |

FIG. 8B     REFR ACM D

| 0 | 7 8 | 10 11 | 12 | 13 | 14 | 15 | 16 | 17 | 43 |
|---|---|---|---|---|---|---|---|---|---|
| | RESIDUE BYTE CNT | SIP | CUB | | TBL EN | DPS | PRI | | |

FIG. 8C     SCHNL EN     STAT FLAG

| 0 | 16 17 | 19 20 | 22 23 | 25 26 | 31 32 | 43 |
|---|---|---|---|---|---|---|
| | CMOD TYPE | CMOD NO. | INTFC NO. | | DPS INDEX POINTER | |

FIG. 8D     CM DSCRPT

| 0 | 11 12 | 17 18 | 20 21 | 26 27 | 28 29 | 30 | 32 33 | 35 |
|---|---|---|---|---|---|---|---|---|
| 0 | MSR VALUE | 0 | CHK CODE MOD REG 407 | 0 | WD CTRL REG.624 | CMD NO. FROM PRI, 580 | INTFC NO. FROM CM ECW - REG. 622 | |

FIG. 8E     INFO

| 0 | 17 | 20 | 35 |
|---|---|---|---|
| DATA ADDRESS 06-23 | | DATA COUNT 00-15 | |

FIG. 8F     DT ADR

| 0 | 2 3 | 4 | 5 | 6 | 7 | 8 | 9 | 11 12 | 35 |
|---|---|---|---|---|---|---|---|---|---|
| RESIDUE BYTE CNT | SIP | CUB | SCH EN | TBL EN | DPS | PRI FLG | | CCW ADDRESS | |

FIG. 8G     CW ADR

| 0 | 8 9 | 11 12 | 14 15 | 17 18 | 23 24 | 35 |
|---|---|---|---|---|---|---|
| CCW FLAGS | CMOD TYPE | CMOD NO | CMOD INFC | | CCW ADDRESS POINTER | |

FIG. 8H     CCW POINTER

| 0 | 2 3 | 6 7 | 8 9 | 17 18 | 23 24 | 35 |
|---|---|---|---|---|---|---|
| | MODE | | SUBCHNL STATUS | IOP NO | SUBCHNL ADDRESS | |

FIG. 8I     SUB ADR

| 0 | 1 2 | 7 8 | 43 |
|---|---|---|---|
| FMT 0-1 | DATA ADRS 0-5 | A SELECTOR OUTPUT 0-35 | |

FIG. 8J     INPUT TO SHIFTER & ALU

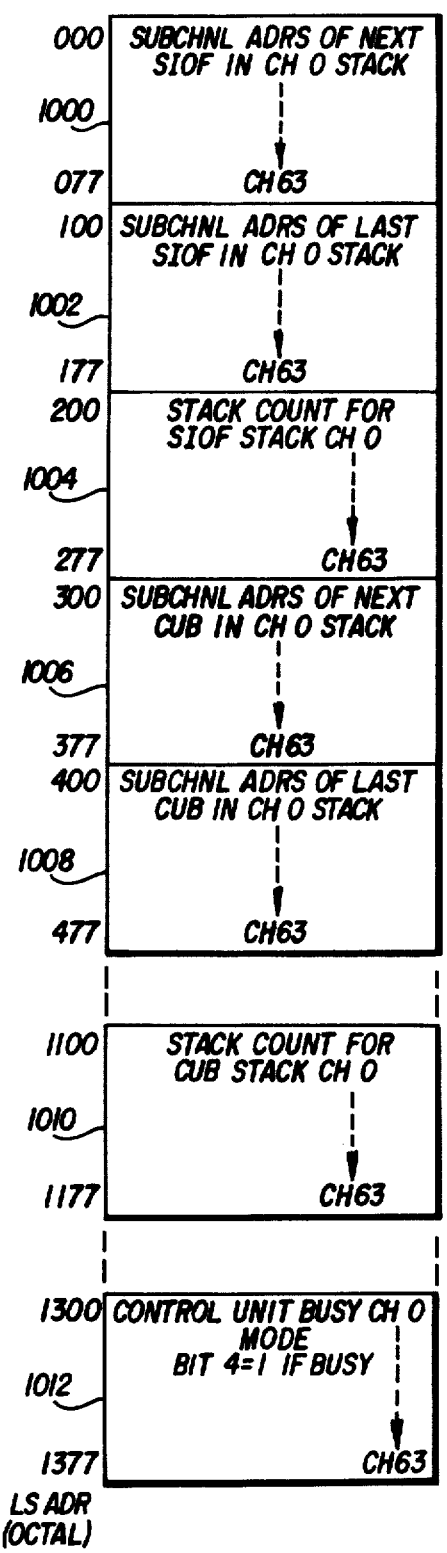
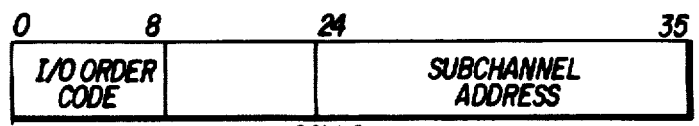
FIG. 8K  CAW 0
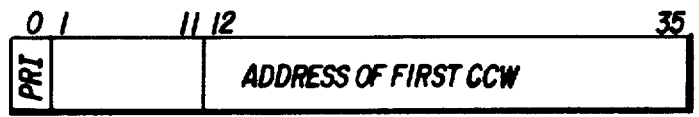
FIG. 8L  CAW 1
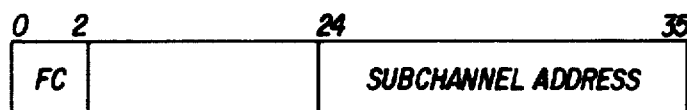
FIG. 8M  COMMAND ECW
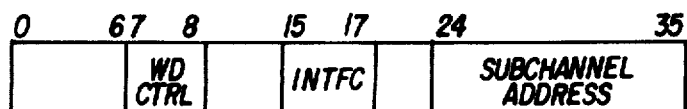
FIG. 8N  CM ECW
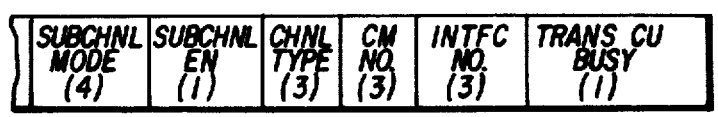
FIG. 8O  CHANNEL DESCRIPTOR
FIG. 10
LS ADR (OCTAL)
FIG. 8P
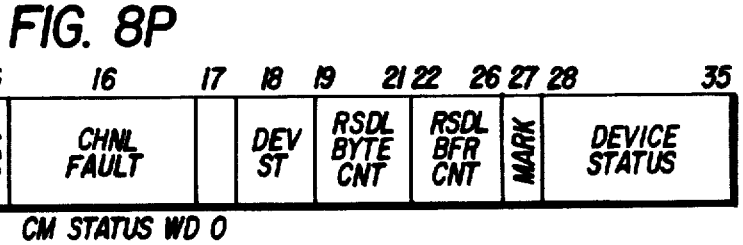
CM STATUS WD 0

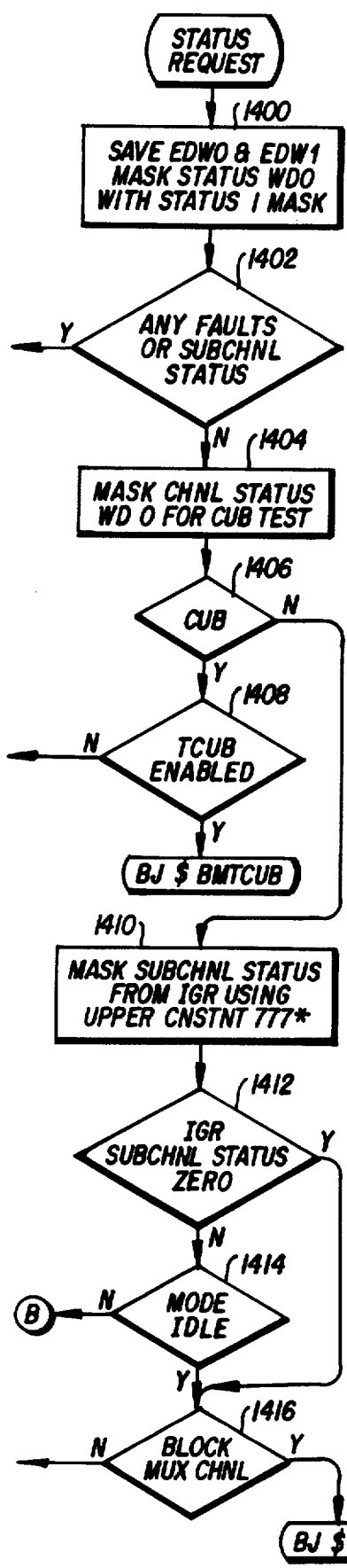
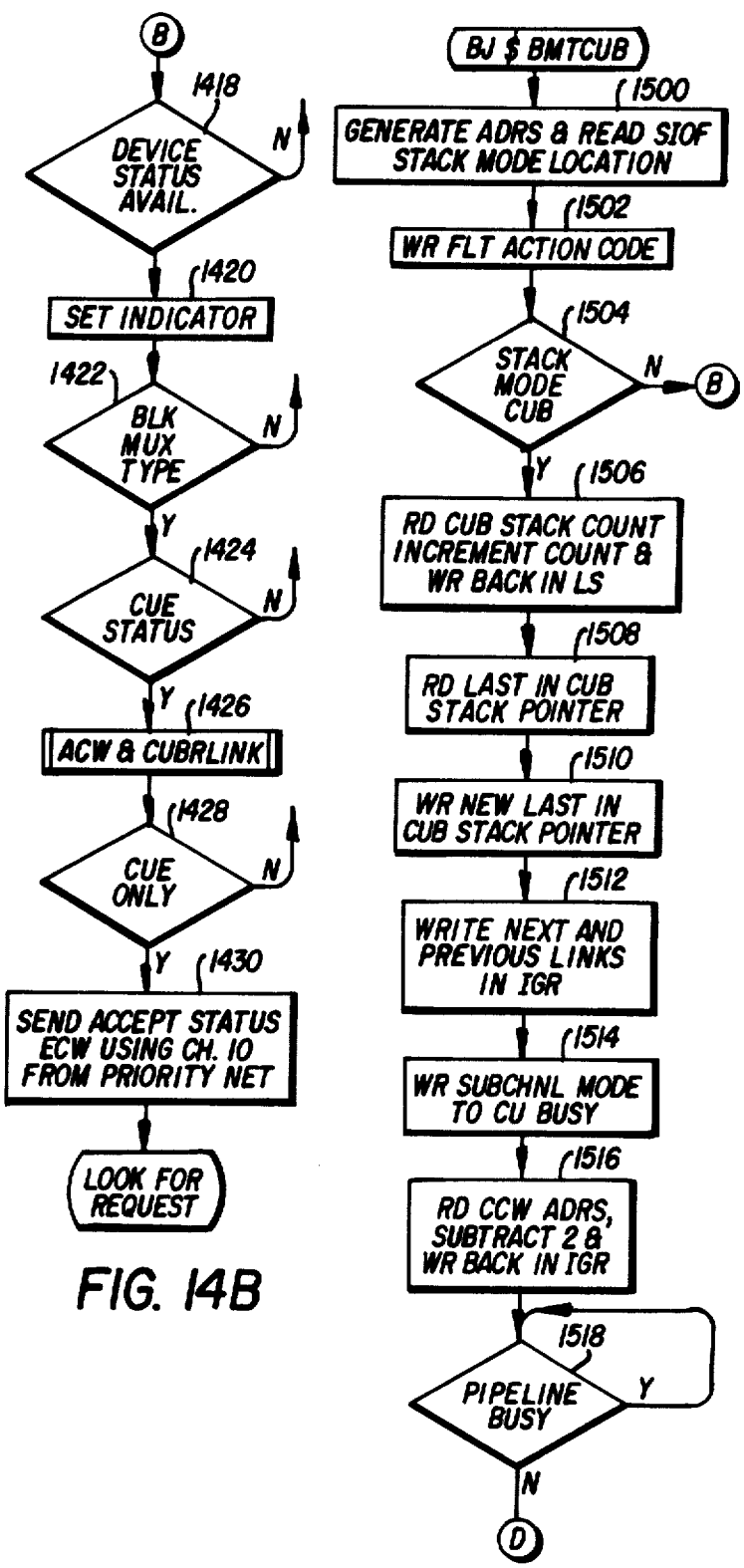
FIG. 14A  FIG. 14B  FIG. 15A

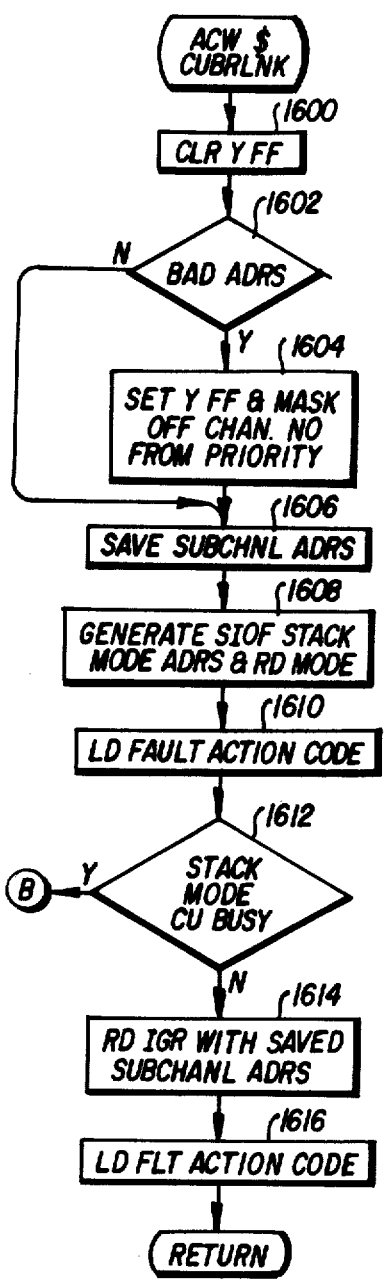
FIG. 16A
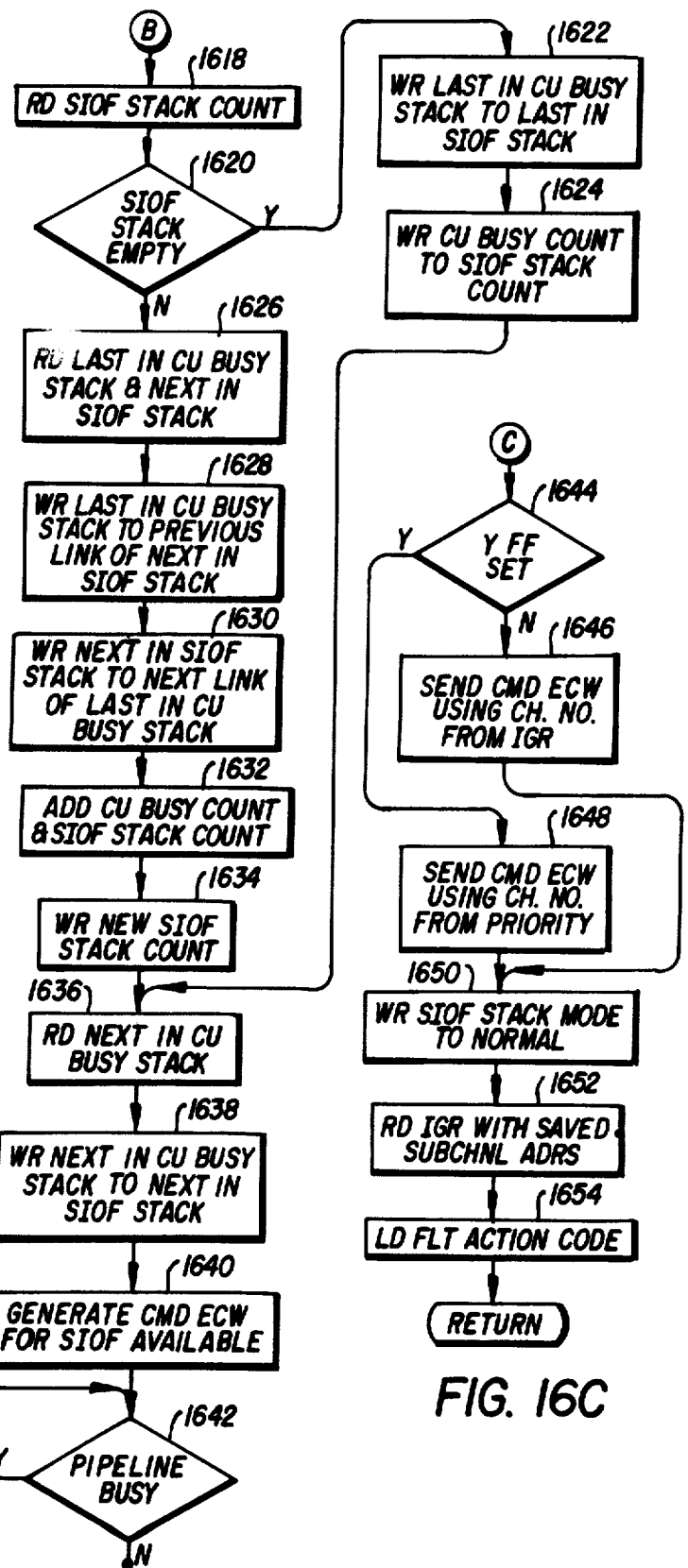
FIG. 16B
FIG. 16C

CONTROL UNIT BUSY QUEUING

RELATED DISCLOSURE

This application includes an Appendix comprising a microcode listing of 93 pages.

BACKGROUND OF THE INVENTION

The present invention relates to an input/output processor for handling communications between a central computer complex and peripheral subsystems. More particularly, the present invention relates to a method and apparatus for reducing the number of interrupts required of an instruction processor when the processor attempts to communicate with a peripheral subsystem but the subsystem is busy.

In the 1100/90 Data Processing System manufactured by Sperry Corporation, one or more instruction processors are connected through one or more type T3067-00 input/output processors (IOP) to a peripheral subsystem which includes one or more storage control units for controlling the access of data on a plurality of disks. In this system an instruction processor wishing to communicate with a subsystem first generates two Channel Access Words (CAW) and a channel program which contains the Channel Command Words (CCW). One of the CAWs contains a pointer to the first CCW of the channel program, while the other specifies a function code and a physical subchannel address. The CAWs and channel program are stored in memory with the CAWs being stored at a specified address or "mailbox". The instruction processor then issues a Universal Processor Interrupt (UPI) to the IOP. In response to the UPI, the IOP reads the CAWs from the mailbox. One of the CAWs contains a Start I/O Fast (SIOF) function code and in response to this code the IOP correlates the physical subchannel address to the proper channel and places the SIOF in an SIOF stack for that channel. If there are other SIOFs in the channel SIOF stack the IOP links the new SIOF to the previous SIOF placed in the stack. There is a separate SIOF stack for each channel.

A channel can be busy processing requests on its other physical subchannels when the IOP places an SIOF in its stack. If the channel is busy when the SIOF occurs, the IOP sets an SIOF pending flag for the channel. When the channel becomes idle it attempts to process the next (oldest) SIOF from its stack by removing it from the stack and sending its corresponding CCW to a designated control unit.

A control unit may be connected to more than one host system channel and a channel may be connected to more than one control unit. One or more control units on a channel may be shared with other systems. Consequently, a channel may not be able to access the control unit with the oldest SIOF in the stack but may be able to access another control unit on the channel's daisy chain. However, absent the present invention the IOP of the foregoing system would, upon receiving a control unit busy status in response to an SIOF's CCW, interrupt the instruction processor to report this status and, upon subsequently receiving status indicating that the control unit is available, interrupt the instruction processor to again report status. At this time the instruction processor would issue another UPI to the IOP to again try execution of the SIOF. The present invention eliminates the necessity of twice interrupting an instruction processor when an SIOF cannot be executed because a control unit is busy.

SUMMARY OF THE INVENTION

An object of the present invention is to provide a data processing system including an instruction processor, a control unit and an input/output processor, the input/output processor being capable of queuing I/O requests without interrupting the instruction processor when an I/O request issued by the instruction processor is directed to a control unit which is busy.

An object of the present invention is to provide an input/output processor which maintains a first queue of pending SIOF requests for a channel which is busy and a second queue of SIOF requests which cannot be executed because the control unit to which the channel is connected is busy, the input/output processor includes a means for linking the second queue to the top of the first queue when the control unit presents to the IOP status indicating that the control unit is no longer busy.

A further object of the invention is to provide a method and apparatus for processing SIOF requests from an instruction processor by establishing an SIOF queue of pending SIOF requests for a channel which is busy, establishing a control unit busy queue of SIOF requests which cannot be initiated because a control unit connected to the channel is busy, and linking the two queues so that when the control unit becomes idle an SIOF request in the control unit busy queue is sent to the control unit before any request in the SIOF queue is executed.

An object of the present invention is to provide a method and apparatus as described above wherein an SIOF queue and a control unit busy queue are provided for each channel.

Other objects of the invention and its mode of operation will become apparent upon consideration of the following description and the accompanying drawings.

BRIEF DESCRIPTION OF THE DRAWINGS

FIGS. 8A-8P illustrate the formats for data occuring at various points in the central control module;

FIG. 10 is a partial map of the LS array;

FIGS. 14A and 14B comprise a flow diagram illustrating the Status Request routine;

FIGS. 15A-15D comprise a flow diagram illustrating the Block Multiplexer Transparent Control Unit Busy routine;

FIGS. 16A-16C comprise a flow diagram illustrating the Control Unit Busy Stack Relink routine;

OVERVIEW

Figure 1:
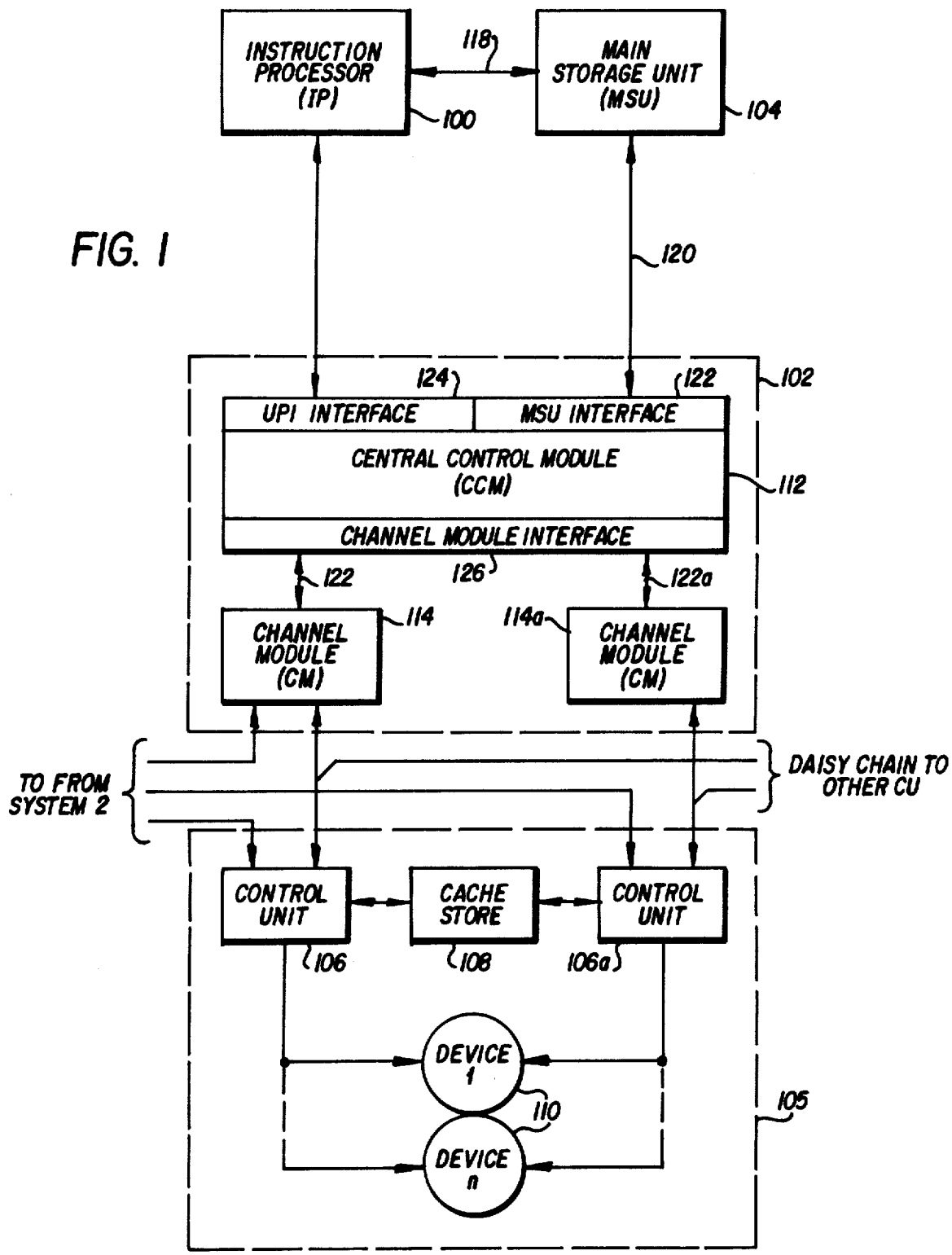
FIG. 1 is a block diagram of a data processing system in which the present invention may be employed.

FIG. 1 illustrates a data processing system including a central computer complex including an instruction processor (IP) 100, and a main storage unit (MSU) 104, an Input/Output Processor (IOP) 102 and a peripheral mass storage subsystem 105 including two storage control units 106, 106a, a cache store unit 108 and a plurality of disk drive devices 110. A minimal Sperry Corporation 1100/90 system is illustrated in FIG. 1. The system may include plural IPs, plural MSUs, plural IOPs, and plural peripheral subsystems. A control unit 106 or 106a may be connected through one or more IOPs 102 to the same or different IPs 100. The MSU 104 is shared by all IPs and IOPs in the system and may comprise plural storage units. In addition, for file sharing purposes the system shown in FIG. 1 may be connected to further systems like that shown in FIG. 1.

The IOP 102, which may be a Sperry Corporation type T3067-00 IOP, includes a Central Control Module (CCM) 112 and a plurality of Channel Modules (CM) 114. The hardware in the CCM will support eight CMs. Although only two block MUX channel modules 114 are shown, an IOP may have up to four block MUX channel modules, up to six word channel modules or a combination of the two without exceeding its throughput capability. However, the present invention is operable with block MUX channel modules only. These modules may conform to the Federal Information Processing Standards 60 (FIPS 60) For I/O Channel Interfaces. The peripheral subsystem 105 may, for example, be of the type disclosed in Robert E. Swenson Pat. No. 4,394,733.

The MSU 104 is connected by multiple leads 118 and 120 to the IP 100 and an MSU interface 122 of the IOP 104. The IP 100 is also conencted to a Universal Processor Interrupt (UPI) interface 124 of the IOP.

In the system shown in FIG. 1 the subsystem 105 may be active on several channel programs at one time performing seek operations to position the heads of disk devices 110. This is made possible because the software (i.e. IP software) uses a different physical subchannel for each active channel program. A physical subchannel comprises a set of registers in a memory in the CCM 112.

Briefly, the system of FIG. 1 handles an I/O operation as follows. The IP 100 prepares a channel program comprising a plurality of Channel Control Words (CCWs) and two channel access words (CAW0 and CAW1) having the formats shown in FIGS. 8K and 8L. The IP stores the CCWs and CAWs in MSU 104 with the CAWs being stored at a specified address or "mailbox". There are four mailboxes which comprise a table. There is a mailbox for each IP interface, with each IP having up to four interfaces. After the CAWs and CCWs are stored in MSU 104, the IP issues a UPI request to the IOP 102 through a UPI interface 124. There are four UPI interfaces in the IOP.

CAW0 contains the I/O order code which in this case is the SIOF order code, and a subchannel address defining the subchannel in the CCM 112 which is to handle the program. CAW1 contains the address of the first CCW of the program to be executed.

When the UPI request is the highest priority request being received by the CCM, it generates the address of the mail box at which CAW0 and CAW1 are stored. The two words are read from MSU 104 into the CCM and the subchannel address from CAW1 is utilized to access a channel descriptor table stored within the CCM. Insofar as the present invention is concerned, the channel descriptor includes a subchannel mode field, a channel type field, a channel module number, and interface number field, a subchannel enable bit and a transparent control unit busy bit as illustrated in FIG. 80. At the time the IOP is initialized, the channel type (block MUX, word, etc.), channel module number and interface number fields are loaded with the appropriate values and the Transparent Control Unit Busy (TCUB) bit is set if the control unit busy feature is to be operative. In addition, the Subchannel Enable bit must have been set by a command from the IP to enable operations over the subchannel. Only the subchannel mode field changes its value during operation of the CCM. As previously indicated, the hardware is designed for a maximum of six channel modules each having four block MUX interfaces or eight word interfaces for connecting to control units like 106, 106a. At initialization time the descriptor table entry is loaded with the channel number (i.e. channel module number and interface number with which the physical subchannel will operate).

The SIOF request is placed in a queue (there is an SIOF queue for each channel) and a word having the format shown in FIG. 8M is sent to a CM to inform it that an SIOF is available. The command sets a flag for the channel in the CM. When the channel becomes idle it issues an SIOF request to the CCM. An SIOF is taken off of the top of the SIOF queue for the requesting channel (except for the control unit busy feature subsequently described). CAW1 is retrieved from a register in the CCM and used to address the MSU and read the first CCWs into the CCM. The CCWs are passed through the CCM and a CM to a control unit to control the peripheral subsystem and the SIOF is removed from its queue. However the control unit to which the CCWs are sent may be busy. In accordance with the principles of the present invention, the control unit sends a status request with busy status to the CCM through the CM. The CCM maintains a control unit busy queue for each channel and in response to the status request with busy status it enters the busy status in the control unit busy queue. The control unit busy queue builds up until the control unit which was busy makes a status request with control unit end status indicating that it is now available to accept another command. At this time the CCM links the control unit busy queue for the channel to the top of the SIOF queue for the same channel so that the SIOFs which could not be executed because the control unit was busy are the first to be sent to the channel when a CM makes an SIOF request.

Figure 2A:
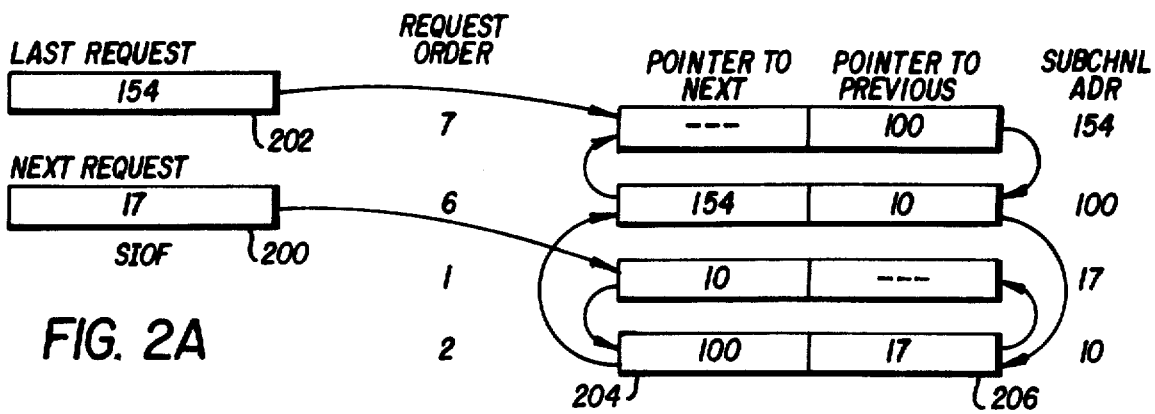
FIGS. 2A and 2B illustrate the method of controlling the SIOF stack and the control unit busy stack, respectively.
Figure 2B:
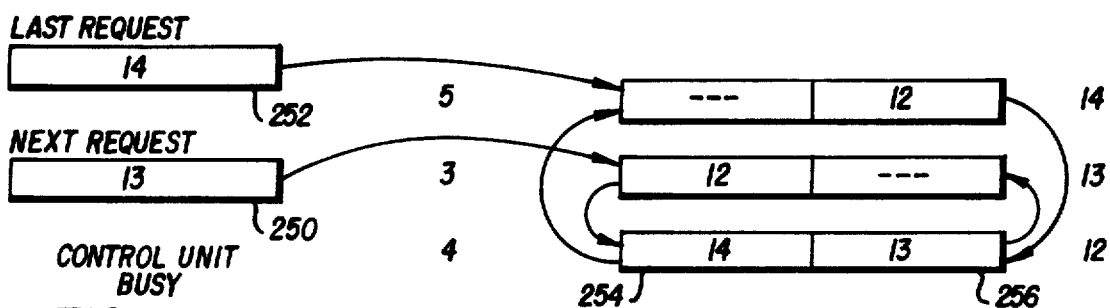

FIG. 2A illustrates an SIOF queue or stack while FIG. 2B illustrates the control unit busy queue or stack. Considering the SIOF stack, the stacks are conventional mechanisms having a pointer 200 which points to the next request to be processed from the stack (the oldest entry) and a pointer 202 which points to the last (newest) request in the stack. Each entry in the stack includes a pointer 204 to the next entry to be processed and a pointer 206 to the previous entry in the stack. The next and previous pointers are subchannel addresses each of which may be utilized to access a set of registers comprising a physical subchannel in the CCM.

There may be up to 64 SIOF stacks, one for each channel. The next request pointers for all stacks are stored in a first table and the last request pointers are stored in a second table, both tables (see FIG. 10) being located in an addressable memory in the CCM.

FIG. 2B illustrates a control unit busy stack and for ease of explanation it may be assumed that there is a control unit busy stack for each SIOF stack. The control unit busy stacks are implemented in exactly the same way as the SIOF stacks.

FIGS. 2A and 2B illustrate the situation where seven SIOF requests destined for a single channel have been received. Requests 1, 2, 6 and 7 are pending, i.e. the CM has been informed that they are available but has not made an SIOF request to the CCM for any of them. Requests 3, 4 and 5 have already informed the CM that the SIOFs are available, the CM has requested them, the CCM has sent the CCWs to the control unit through the CM, and the control unit has returned busy status through the CM to the CCM.

Figure 2C:
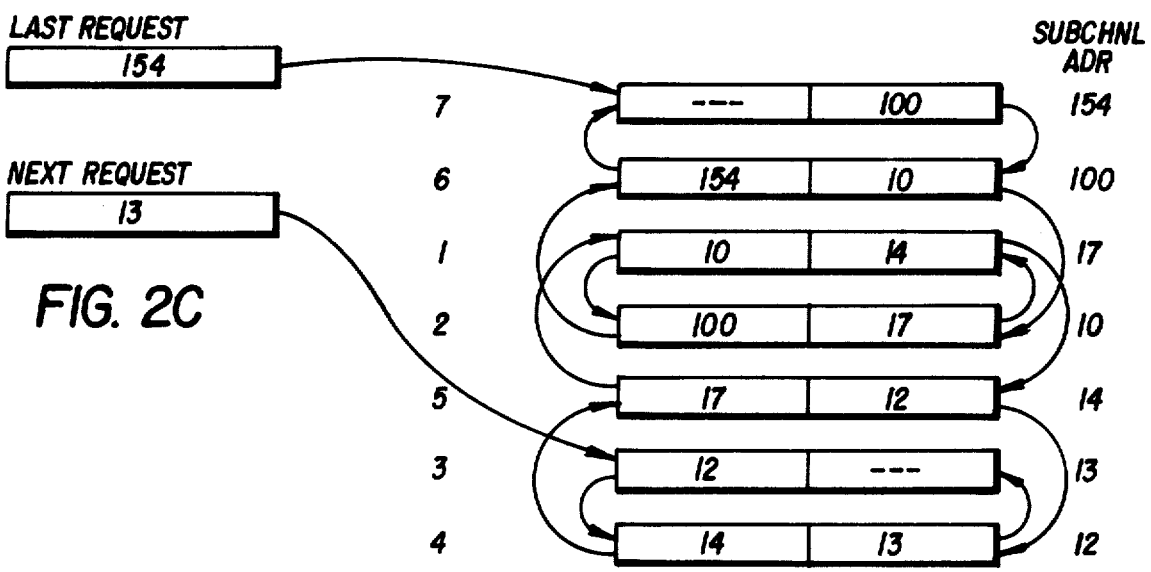
FIG. 2C illustrates the manner in which entries in the control unit busy stack are linked to, and placed on top of, the SIOF stack.

FIG. 2C illustrates the SIOF stack of FIG. 2A linked with the control unit busy stack of FIG. 2B to form an SIOF stack having the entries from the control unit busy stack placed on the top of the stack, i.e. linked as the oldest entries in the stack. In accordance with the present invention this occurs when the channel with which the control unit busy and SIOF stacks are associated presents control unit end status to the CCM.

CENTRAL CONTROL MODULE

Figure 9:
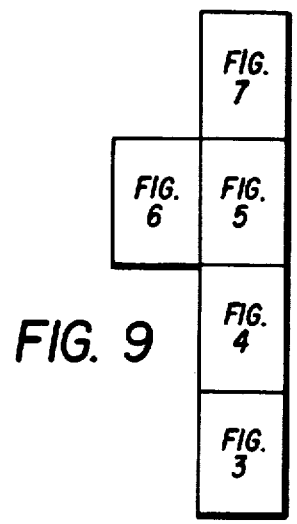
FIG. 9 is a map of FIGS. 3-6.
Figure 7:
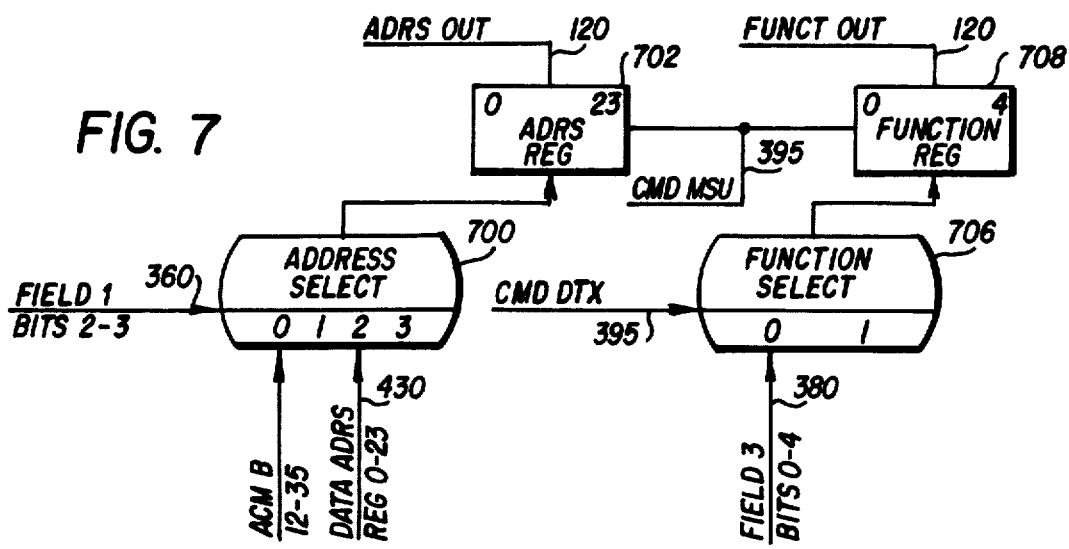

FIGS. 3-7, when arranged as shown in FIG. 9, comprise a block diagram illustrating the data flow paths in CCM 112. A control store (CS) 300 stores commands for controlling the operation of the CCM. CS 300 is addressed by a CS Address Register 302 and the commands are read from CS 300 one at a time and entered into a set of latches 304. CS 300 is a 4k memory which stores words having 66 bits.

The commands read from CS 300 have the format represented by the arrangement of latches 304. Bits 0-2 of the command specify the type of the command. There are eight types of commands and they are distributed throughout the CCM to control the operations.

000 = SPL (Special)
001 = IGR (Internal General Register)
010 = IFC (UPI/Channel Interface)
011 = MSU (Main Storage Unit Interface)
100 = FTL (Fault Logging)
101 = SHF (Shift)
110 = ALU (Arithmetic Logic Unit Normal)
111 = DTX (Data Transfer)

TABLE I

Bits 3-14 of a command specify the Next Control Store Address (NCSADR). The value in the NCSADR field is normally applied over leads 306 to one set of inputs of a CS address selector 308. In the absence of a branch operation the NCSADR field specifies the address in CS 300 at which the next command is stored. When a branch operation is performed, NCSADR is used as a base address to which some value is added in order to obtain the address of the next command.

Bits 15-30 of a command define a constant (CNSTNT) field. The constant stored in this field is used in unique ways in MSU, FTL, SHF and IGR type commands and can also be gated through a selector 500 (FIG. 5) to an ALU 502.

Bits 31-33 of a command are the CSLSCT field which controls a Local Store (LS) 504 as well as the source of the address for addressing the LS 504. Bits 1 and 2 of the field specify read (10) or write (11). Bit 0 determines the LS address selection as described later.

Bits 34-43 of a command are the CSLSAD field which may contain an address for addressing LS 504. The value in the CSLSAD latches is applied over leads 310 to a selector 506.

Bits 60-65 of a command define a branch condition. The value in the branch field is applied to three sets of selectors 312, 314 and 316. The various conditions to be tested are applied to selectors 312, 314 and 316 by way of leads X, Y and Z, respectively, from various sources all of which are not specifically shown in the drawing. If the branch field of a command contains a value between 10* and 57* (where * indicates octal code) selector 316 is enabled and if the specific condition tested for is present an output signal is produced through two-way branch logic circuits 318 to the carry input of a control store address adder 320. The address from the NCSADR field of the command is applied to the A inputs of the adder and is incremented by one by the carry input. The output of adder 320 is applied to the CS address selector 308. When the branch condition is met the branch logic 318 produces a signal on lead 322 to address selector 308 so that the output of the adder 320 is passed through the address selector to the CS Address Register 302.

Only one signal at a time is applied to the select circuits 316 and the branch is either to NCSADR if the condition is not met or NCSADR + 1 if the condition is met. When ACM A is tested for a 0 or 1 value, NCSADR + 1 is branched to if ACM A does not contain a value of 0 or 1, respectively.

The Select 6X* and Select 7X* circuits 312 and 314 provide tests for multiway branches. For example, the branch field may enable a certain set of inputs to selector 314 and a value such as an order code may be applied to the Y inputs. The Select 7X circuits produce a twelve-bit output which is passed through multiway branch logic 324 to the B inputs of adder 320. The adder adds the output of circuit 324 to the output from the NCSADR field of the command and the result is applied to the selector 308. The branch logic circuit 324 also produces a signal on lead 322 to address selector 308 and gate the output of the adder through the selector to the CS Address Register 302.

Select circuits 6X* 312 operate in essentially the same way as the 7X* circuits except that they produce a three-bit output through branch logic 324 to adder 320. With respect to the present invention, the primary use of the 6X* select circuits is to cause a branch to one of eight addresses depending upon the value of the three low order bits (1-3) of a Subchannel Mode Register 406.

The Look For Request Branch 48 (60*) is a special branch operation which looks for various requests and branches to a command in a special address in the CS 300 depending upon the type of request having the highest priority. A priority network 580 receives priority requests from the UPI interfaces which interface with the IPs 100 as well as data, status and SIOF requests from each of the CMs 114,114A. The branch field of the command is decoded and enables the priority network which produces an output signal indicating whether the highest priority request is a data, status, UPI or SIOF request. In the case of a status, UPI or SIOF request these signals are applied over leads 326, 328 and 330 to a priority encoder 332 and an OR 334. The decoded Look For Request branch field also causes a Look For Request signal to be generated and this signal is applied over a lead 336 to an AND 338. Finally, the decoded Look For Request branch field energizes lead 322. Depending upon which type of request has the highest priority one of the leads 326, 328 or 330 is applied to the priority encoder 332 and through OR 334 and AND 338 to the CS address selector 308. The output of AND 338 together with the energized state of lead 322 selects the output of the priority encoder 332 as the address of the next command to be read from CS 300. If the highest priority request is a status request then priority encoder 332 generates the address 1015* which passes through CS address selector 308 to the address register 302. If the highest priority request is a UPI request then priority encoder 332 generates the address 1016* and if the highest priority request is an SIOF request then the priority encoder generates the address 1017*.

Fields 1-4 of a command have various uses depending upon the command type. Some of these uses necessary to an understanding of the present invention are described below while Appendix A sets forth the specific operation performed for the different binary values of each field for each type of command. As will be understood by those skilled in the art, decoding circuits are required for certain fields of a command held in latches 304. However, since these circuits are of conventional design, the drawings are such as to indicate that the decoders are included in latch registers 304.

Figure 4:
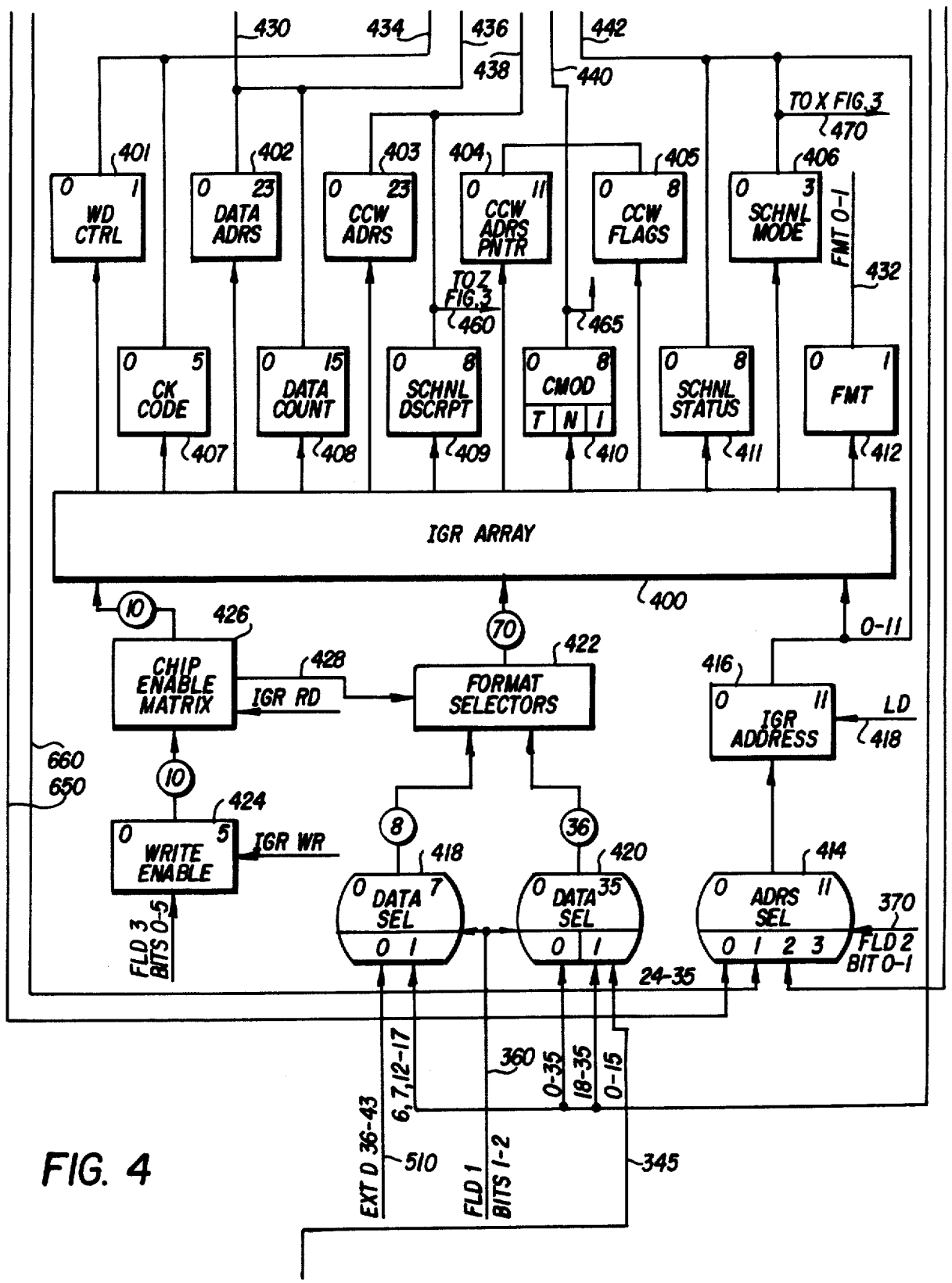

FIG. 4 illustrates an Internal General Register (IGR) array 400 having a plurality of output latches 401-412. The IGR array 400 is a 4k×144 bit memory and contains the current information and status associated with each subchannel. The array includes both an internal general register memory and a channel descriptor table memory. Each entry in the channel descriptor table includes at least the information illustrated in FIG. 8D.

The array 400 is addressed by an address applied through a selector 414 to an IGR Address Register 416. The output of register 416 (i.e. a subchannel address) is applied to the array 400 to either write into the array or read from the array into the latches 401-412. Each address in the array stores information corresponding to the legends in latches 401-412.

The IGR array 400 is sequenced by an IGR type command, or during a Look For Request sequence. Field 2 of the IGR command specifies the source of the IGR address according to Table II.

TABLE II

| Field 2 | Address Source (12 LSB) |
| --- | --- |
| 00 | MSU WD0 |
| 01 | IGR ADR |
| 10 | ACM C |

IGR ADR (01) does not actually control the selector 414. Instead, it prevents the application of a signal over lead 418 to the IGR Address Register 416 thereby preventing loading of the register and retaining therein the current IGR address.

Figure 5:
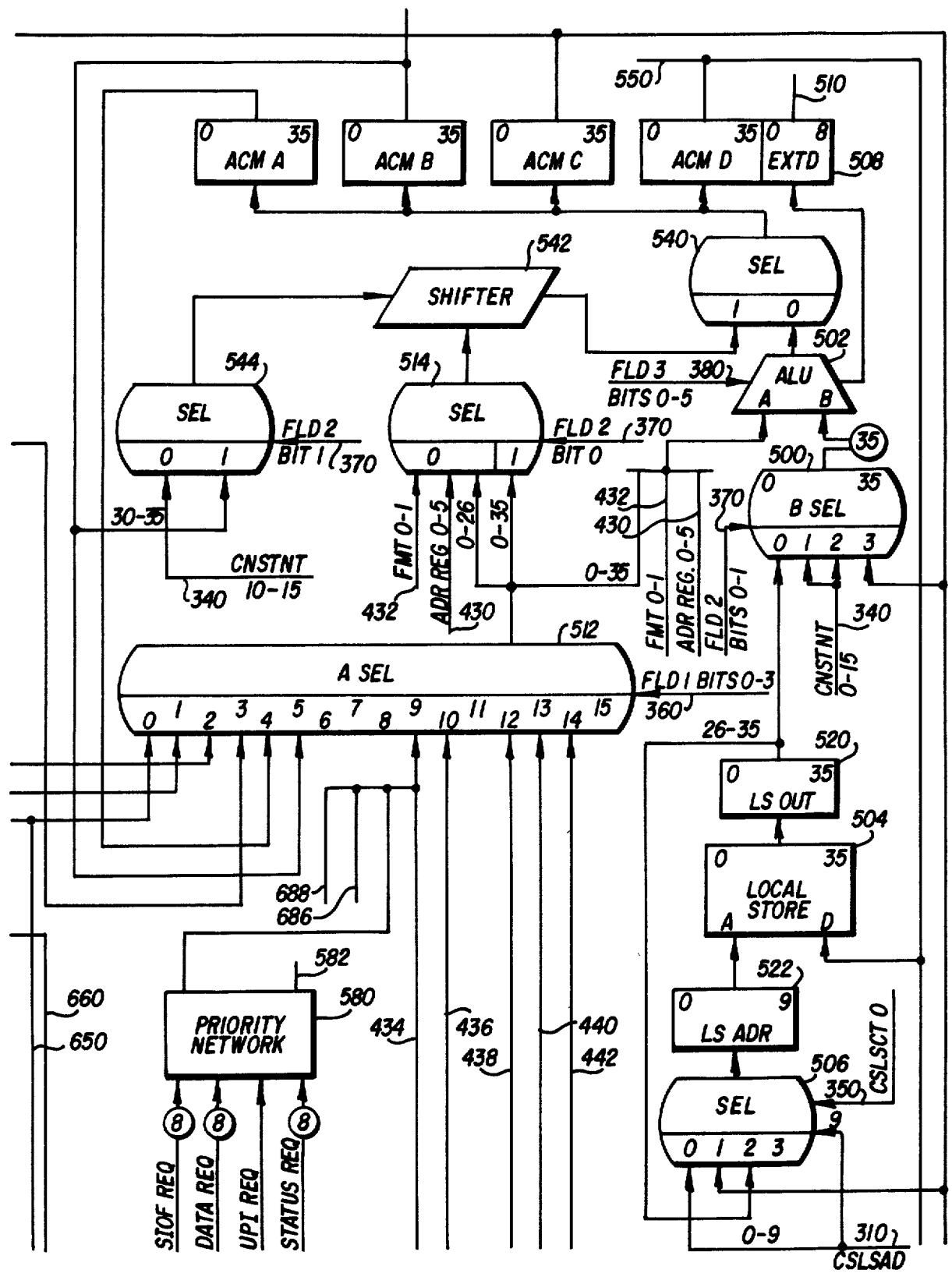

Field 2 of an IGR command controls selector 414 to pass either the 12 low order bits from the most significant word at the output of an MSU selector (field 2 = 00), the 12 least significant bits from a CI Data Register 352 (01 and Look For Request Sequence) or the 12 low order bits from an accumulator register ACM C (FIG. 5).

Data is written into the IGR array 400 through one or both of two data selectors 418 and 420. These selectors are both addressed by field 1 bits 1 and 2 of an IGR command. The output of ACM D (FIG. 5) is applied to both selectors and the output of the Extended D Register (EXTD) is applied to selector 418 over lead 510. The constant field of a command is applied over leads 345 to selector 420 from the control store output latches 304.

If field 1 bits 1 and 2 of an IGR command are 01 then the output of selectors 418 and 420 has the format shown in FIG. 8A. On the other hand, if bits 1 and 2 have the value 10 then the output from the selectors has the format shown in FIG. 8B. In either event, a 44-bit word is applied to a set of format selectors 422.

When a read operation is performed using the IGR array 400 all registers for the subchannel address contained in Address Register 416 are read out to the latches 401-412. However, for a write operation the set of registers specified by the address in the IGR register may be selectively written into in various combinations as defined by field 3 of an IGR command. Bits 0-5 of field 3 are applied to a Write Enable Register 424 whose outputs drive a chip enable matrix 426. The chip enable matrix enables the various chips in the IGR array. In addition, output signals from the chip enable matrix are applied over leads 428 to the format selectors 422 to direct the input data to the particular registers for the specified subchannel which are to be written into. Field 4 of the IGR command determines whether a read or a write operation is to take place. Bit 2 must be set to enable either a read or write operation. If bit 3 is a zero then a read operation is performed and if bit 3 is a one then a write operation is performed. Bit 3 enables the loading of the Write Enable Register 424 for a write operation and on a read operation is enables the chip enable matrix 426 so that the chips in the IGR array are enabled for reading. On a read operation the chip enable matrix does not produce output signals on leads 428 to control the format selectors 422.

All of the various write combinations specified by field 3 are not necessary for an understanding of the present invention. However, some of the enables are given below.

Bits 0-2 of field 3 of an IGR command are decoded to cause the writing into certain IGR registers as set forth in Table III.

TABLE III

| Bits 012 | Write Enable |
| --- | --- |
| 000 | No OP |
| 001 | CCW ADR (20-43) |
| 010 | CCW FG (12-20) |
| 011 | SCHNL STAT (35-43) |
| 100 | CM DSCRPT (18-43) writes channel module type, number and interface number and CCW address pointer |
| 101 | WD CTRL (42-43) |
| 110 | STAT FLAG (38-43) writes subchannel status including residue byte count, table enable, subchannel enable, device path select bit, priority flag and sense in progress bit |
| 111 | FTL (38-43) write fault log check code modifier register |

In Table III, the numbers in parentheses indicate the bits of the 44-bit input word (FIG. 8A or 8B) which are written into the register or registers in the array.

Bit 3 of field 3, when set, enables the writing of bits 40-43 of an input data word into the Subchannel Mode Register. When bit 4 of field 3 is set then the Data Count (DT CNT) field is written into from bits 28-43 of the data input word. When bit 5 of field 3 is set then the Data Address (DT ADR) and the Format FMT registers are written into. The Format register receives bits 0 and 1 of the input data to the IGR array while the Data Address Register receives bits 2-25.

The outputs from latches 401-411 are applied over groups of leads 434, 436, 438, 440 and 442 to an A selector 512. In addition, the six high order bits of the data address latches 402 and the output from the format latches 412 are applied over leads 430 and 432 to the inputs of a selector 514 and the ALU 502. Some of the latches, i.e. 406, 409 and 410 have their outputs connected to the select circuits 312, 314 and 316 for branch testing purposes as subsequently described.

The LS 504 shown in FIG. 5 is a 1k memory for storing 36-bit words plus parity. Data is applied to LS only from ACM D. When LS is addressed one word is read into LS out latches 520 from whence it is applied to B selector 500 and to one set of inputs of address selector 506. The address selector selects the source of the address for addressing LS 504 and the selected address is read into an LS Address Register 522.

The address selector 506 is controlled by the high order bit of the CSLSCT field of a command. If this bit is zero then the address is selected from the CSLSAD field of the command which is available on leads 310. If CSLSCT bit 0 is a one then the source of the address is determined by the least significant bit (bit 9) of CSLSAD. If bit zero of CSLSCT is a one and bit 9 of CSLSAD is zero then the output of ACM C is passed through the selector to address LS. On the other hand, if bit zero of CSLSCT is a one and bit 9 of CSLSAD is a one then the output of LS output latches 520 is gated through the selector to address LS 504.

The ALU 502 is 44-bits wide and comprises a 2-bit format adder, an 18-bit data count adder and a 24-bit data address adder interconnected for carries. ALU 502 performs arithmetic and logic operations on operands applied to its A and B inputs (ALU A and ALU B), the particular operation performed being defined by the value in field 3 of an ALU command. Outputs from the ALU are passed through a selector 540 to four accumulator registers ACM A, ACM B, ACM C and ACM D. Field 4 of an ALU or Shift type command enables one or more of the registers to receive a given output from the ALU.

The B input to ALU 502 is derived from a B selector 500. This selector receives at its inputs the output of the LS output latches 520, the value stored in the CNSTNT field of the CS latches 304 and the output of ACM C. Selector 500 is addressed by bits 0 and 1 of field 2 of an ALU instruction according to the following table.

TABLE IV

| | |
|---|---|
| 00 | LS (Local Store) |
| 01 | CS CST L (Control Store Constant Lower) |
| 10 | CS CST U (Control Store Constant Upper) |
| 11 | ACM C (Accumulator C) |

When field 2 of an ALU command has the value 01 the constant value on lead 340 is gated into bit positions 2-17 of the selector while zeros are applied to positions 0,1 and 18-35. On the other hand, if field 2 has the value 10 then the constant value on lead 340 is gated through bit positions 20-35 of the selector.

After the ALU performs an operation on its A and B inputs, the six high order bits of the data address adder and the two bits from the format adder are stored in EXT D Register 508 with the format bits being in the lower orders. The 18 low order bits from the data address adder are concatenated with the 18 bits from the data count adder to form a 36-bit result which is applied to selector 540. The bits from the data count adder form the lower orders of this value. With respect to the present invention ALU 502 may be viewed as a 36-bit ALU which performs an arithmetic or logic operation on two 36-bit operands applied to ALU A and ALU B.

The A input to ALU 502 is derived from A selector 512, the IGR format latches 412 and the IGR data address latches 402 with the output of the selector 512 being applied to the 36 higher order positions of the ALU and the address latch output being applied to the six least significant bit positions.

The A selector is addressed by field 1 of an ALU or SHF command and passes a 36-bit word through to ALU 502 and selector 514. The following table shows the source of the word.

TABLE V

| Field 1 | Mnemonic | Data Source |
|---|---|---|
| 0000 | MSU WD0 | MSW from high 36 bits of selector 604 |
| 0001 | MSU WD1 | LSW from low 36 bits of selector 604 |
| 0010 | CMOD WD0 | Register 630 |
| 0011 | CMOD WD1 | Drivers 632 |
| 0100 | ACM A | ACM A |
| 0101 | ACM B | ACM B |
| 1001 | INFO | See FIG. 8E |
| 1010 | DT ADR | See FIG. 8F |
| 1011 | ZERO | |
| 1100 | CCW ADR | See FIG. 8G |
| 1101 | CCW PNTR | See FIG. 8H |
| 1110 | SUB ADR | See FIG. 8I |
| 1111 | ZERO | |

The field 1 codes not listed in Table V relate to fault logging and are not pertinent to the present invention.

The selector 514 provides the data input to a shifter 542 while a selector 544 provides a value indicating the number of positions the data should be left circular shifted. The normal input format shifter 542 and ALU 502 is shown in FIG. 8J.

The output of A selector 512 is applied to selector 514 and the A inputs of ALU 502 together with the signals FMT0-1 and ADR REG 0-5. Field 2 bit 0 of a shift-type command selects the data input mode for the shifter 542 by addressing selector 514 to select either a 44-bit or 36-bit mode. Field 2 bit 0 when false defines mode 44 and addresses selector 514 so that the upper 35 bits of the 44-bit word (FIG. 8J) applied thereto are passed through to the shifter 542. Field 2 bit 0 when true defines a 36-bit mode wherein the lower 36 bits of the 44-bit word of FIG. 8J, i.e. the output from selector 512 are passed through to the shifter 542.

Field 2 bit 1 of a SHF command controls a selector 544 to select the source of a value indicating the number of places the data applied to shifter 542 is to be left-shifted. If field 2 bit 1 is false then the CNSTNT field from latches 304 is selected as the shift count. On the other hand, if field 2 bit 1 is true then the value in accumulator B is passed through selector 544 to control the shifting of shifter 542.

Figure 6:
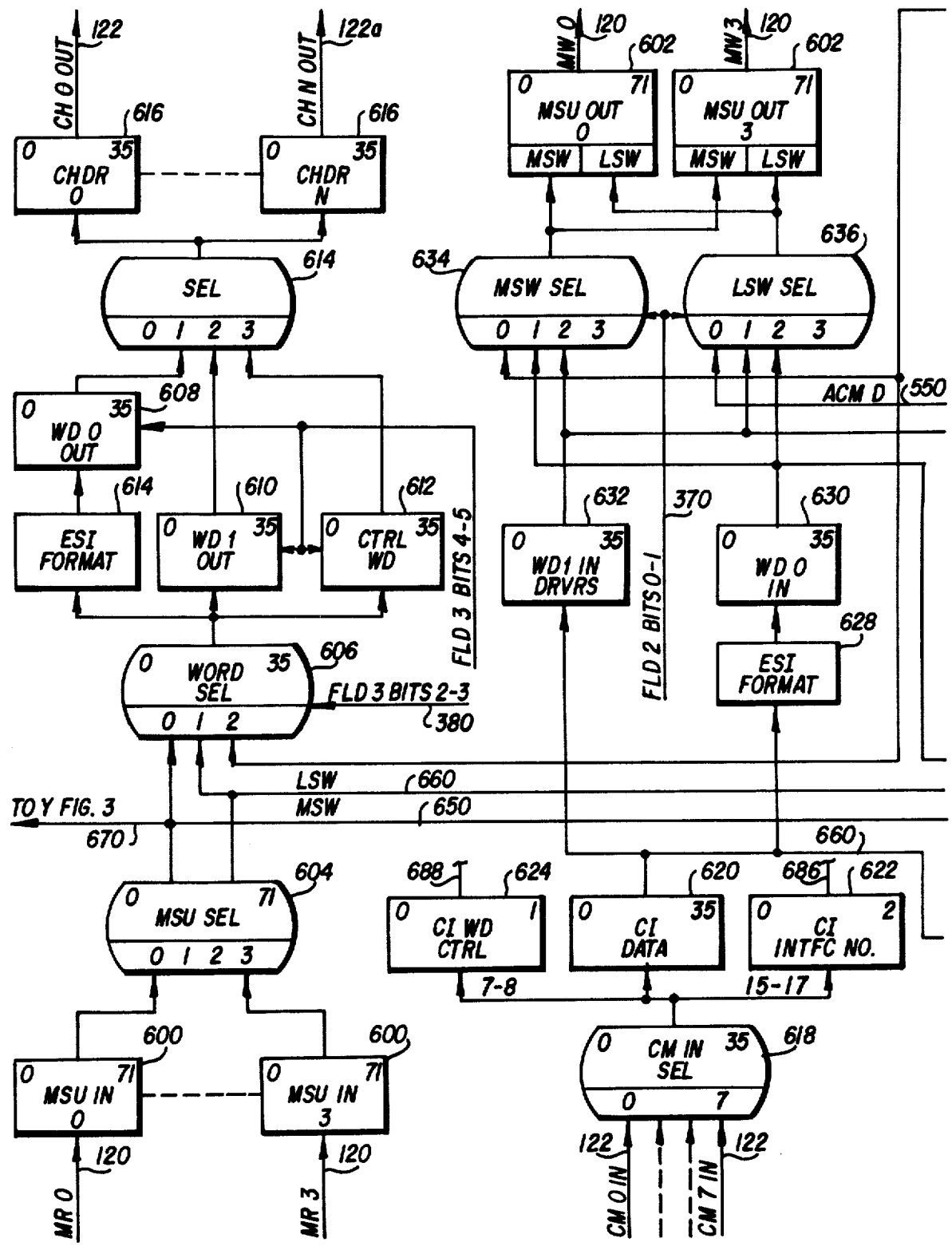

FIG. 6 illustrates the MSU pipeline and data interfaces between the CCM 112, the channel modules 114, 114a and the MSU 104.

Since there may be four MSUs 104, the MSU interface circuits include four MSU In Registers 600 for receiving data from the MSWs and four MSU Out Registers 602 through which data is passed to the MSUs. The registers 600 and 602 are all two word (72-bit) registers. The registers 600 receive data and control words from MSUs 104 while registers 602 provide output data to be written into the MSUs.

A save data stack (not shown) saves information required to complete an MSU request thus allowing pipelining of MSU requests. The saved data controls MSU selector 604 to select the output of one of the registers 600. The most significant word (bits 0–35) from selector 604 are applied to the zero inputs of word selector 606, the A selector 512 and address selector 414. The least significant word output from selector 604 is applied to the one inputs of selectors 606 and 512.

Field 3 of an IFC type command addresses word selector 606 to select the source of data to be transferred to a channel module. The data may be a control word from ACM C or a data word from selector 604. Table VI shows the input selection for selector under control of bits 2 and 3.

TABLE VI

| Bits 23 | |
|---|---|
| 00 | MSU In (Normal) |
| 01 | MSU R (Reverse) |
| 10 | ACM C |

Bits 4 and 5 control the loading of a WD 0 Out Register 608 a WD 1 Out Register 610 and a Control Word Register 612. All of these registers receive the output of word selector 606, the input to register 608 being through an ESI formatting circuit 614. Field 3 bits 4 and 5 control the loading of the registers according to Table VII.

TABLE VII

| 00 | CTRL REG |
|---|---|
| 01 | WD 0 |
| 10 | WD 1 |
| 11 | WD 0,1 |

Bit 0 of field 3 in an IFC command is not utilized and bit 1 is a Load Enable Bit which must be set in order for bits 2-5 to exert control. Field 2 of an IFC command is not used while field 1 controls request/acknowledge between the IOP and the IP and field 4 controls the generation of control signals which are applied to the channel modules.

The outputs of registers 608, 610 and 612 are applied to inputs of a selector 614. This selector is controlled by a sequencer to selectively gate the contents of registers 608, 610 and 612 to channel output drivers 616. The sequencer may control selector 614 during one sequence to pass the contents of one or more than one of the registers to the channel drivers, the arrangement being such that three words may pass through the drivers in one sequence. There is a set of channel drivers for each of the channel modules 114 and the data from selector 614 is applied in parallel to all of the drivers. A channel number (module number/interface number) is applied by circuits not shown to the channel modules to enable the correct channel. For data transfers the channel module/interface number is retrieved from the MSUs Save Data Stack but for operations initiated by the CCM microcode the channel module/interface number is read from the channel descriptor table for the subchannel in use.

A block MUX channel module 114, 114a may apply a word or data to a CM In selector 618 and make an SIOF, data or status request. The selector has eight sets of inputs, one for each channel module. In response to a status or SIOF request the priority network 580 evaluates priority and when this request is the highest priority request pending a register in the priority network is loaded with a value indicating the number of the channel module which is being granted priority. This value is applied to selector 618 to gate data from the selected channel module through the selector to a Channel In Data Register 620, a Channel In Interface Number Register 622 and a Channel In Word Control Register 624. The channel module supplies three words in sequence to the selector 618. The first word is a Channel Module Exchange Control Word (CM ECW) and the two following words are data or status words. As shown in FIG. 8N, bits 15-17 of the CM ECW identify the interface from which the request originated and these bits are entered into register 622. Bits 7 and 8 of CM ECW identify which of the following data words are valid.

TABLE VIII

| Bits 78 | |
|---|---|
| 00 | No Valid Words |
| 01 | Word 1 Valid |
| 10 | Word 0 Valid |
| 11 | Word 0 and Word 1 Valid |

The control word is also passed through the CI Data Register 620 and bits 24–35 (subchannel address) are routed over leads 660 to the IGR address selector 414.

Word 0 and word 1 which follow the CM ECW are passed through the CI Data Register 620. Word 0 is passed through ESI format circuits 628 to the Word 0 In Register 630. Word 1 is applied to Word 1 In Drivers 632. The outputs from register 632 and drivers 632 are applied to the two and three inputs respectively of selector 512. In addition, the output of register 630 is applied to the one inputs of a Most Significant Word Selector 634 and the two inputs of a Least Significant Word Selector 636. The output of drivers 632 is applied to the inputs of selectors 634 and 636. The output of ACM C is applied to selector 634 while the output of ACM D is applied to selector 636. Selectors 634 and 636 are addressed by field 2 of an MSU command and select the source of data words to be supplied to the MSUs.

TABLE IX

| Bits | |
|---|---|
| 00 | ACM C.D |
| 01 | CMOD DT N (Normal) |
| 10 | CMOD DT R (Reversed) |

Field 1 of an MSU command controls an address selector 700 (FIG. 7) which passes an address out to the MSUs through address register 702 according to the following table.

TABLE X

| | |
|---|---|
| 00 | ACM B (Lower 24 Bits) |
| 10 | DT ADR From IGR |

Field 3 of an MSU command specifies the operation to be performed.

TABLE XI

| | |
|---|---|
| 000100 | RD 2 WD (Read Two Words) |
| 010101 | WR 2 WD (Write Two Words) |
| 010011 | WR 1 WD (Write One Word) |

Field 4 of an MSU command contains codes for fault logging and tells why an MSU request was made.

TABLE XII

| | |
|---|---|
| 0000 | Micro REQ |
| 0001 | DT TRAN |
| 0010 | DEV Path SEL |
| 0011 | UPI |
| 0100 | CHNL STAT WD |
| 0111 | CCW FTCH |

INITIATING AN I/O OPERATION

An IP 100 initiates an input or output operation by loading CAW0 and CAW1 into a special location or "mail box" in a control table in MSU 104 and then issuing a UPI request to the IOP 102. If the UPI interface circuits 124 are not busy, the request is stored until the IOP executes a command containing a branch code of 60* (Look For Request). During execution of the command which looks for the request, the CCM generates the signal Look For Request and, if the UPI request is the highest priority request, the priority circuits in the CCM also generate the signal Request Type UPI. These signals are applied to AND 338 and priority encoder 332 as previously explained to generate the address 1016* and gate it through selector 308 to the CS Address Register 302. The value 1016* loaded into register 302 is the address of the first instruction of the UPI routine.

UPI ROUTINE

Briefly, the UPI routine reads CAW0 and CAW1 (FIGS. 8K and 8L) from the mail box in MSU 104. The mail box address is generated by adding the channel number constant to an address read from LS address 1000*. LS address 1000* is loaded with the base mail box address at the time the IOP is initialized. After the mail box address is generated CAW0 and CAW1 are transferred from the MSU to the IOP after which the UPI routine branches to the Order Code routine specified in bits 00-08 of CAW0.

Figure 11:
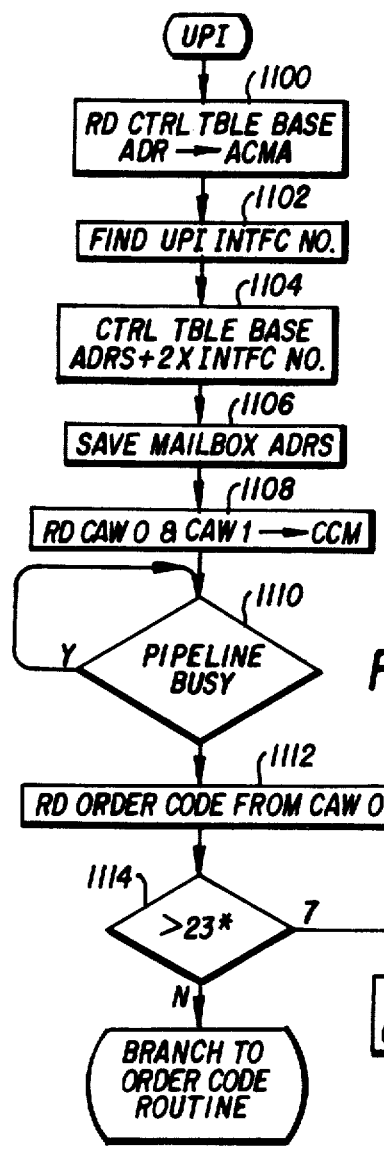
FIG. 11 is a flow diagram illustrating the UPI routine.

Referring now to FIG. 11, the UPI routine begins at step 1100 by reading the contents of address 1000* from the LS 504 into the LS output register 520. The address for addressing LS 504 is obtained from the CSLSAD field of the word stored in CS address 1016*. This address is applied over leads 310 to the zero inputs of selector 506 and passes through the selector and the LS address register 522 to LS 504. After the word at address 1000* is read from LS 504 into register 520, it is transferred through selector 500, ALU B, and selector 540 to ACM A.

The command which transfers the base mail box address from register 520 to ACM A has a code in the branch field that finds the number (step 1102) of the UPI interface which received the UPI request. The value in the branch field is applied to the select 7X branch test circuits 314. These circuits are also receiving the output of an encoder (not shown) which encodes the value of the interface over which the request was received. Depending on whether the request was received over interface 0, 1, 2 or 3 the 7X select circuits 314 generate the value 00, 01, 10, or 11 and this value passes through the Multi-Way Index M Branch Logic 324 to the B input of CS address adder 320 where it is combined with the NCSADR field of the command. The output of the adder 320 is applied to the one inputs of selector 308.

If the UPI request was received over interface 1, 2 or 3 then branch logic 324 produces a signal on lead 322 which is applied to selector 308 to select the output of adder 320 if the UPI request was received over interface 1, 2 or 3. Thus, in this case the next instruction read from CS 300 is read from NCSADR+1, NCSADR+2 or NCSADR+3. On the other hand, if the UPI request was received over interface 0, the branch logic 324 does not produce a signal on lead 322, thereby enabling NCSADR to be applied through the zero inputs of selector 308 to become the CS address from which the next command is read.

At step 1104 the next command adds the control table base address, now present in ACM A to twice the value of the number of the interface over which the UPI request was received. A value equal to twice the number of the interface is contained in the CNSTNT field of the command and this value is transferred over leads 340 and through selector 500 to ALU B. Field 1 of the command addresses selector 512 so that the control table base address in ACM A is passed through the selector to the A inputs of ALU 502. The constant value is added to the control table base address and the result is passed through selector 540. Field 4 of the command contains a value which specifies the destination as both the B and the D registers hence the output of selector 540 is entered into ACM B and ACM D.

Steps 1106 and 1108 are accomplished by a single command. It contains a zero value in field 1 and this value enables address selector 700 so that the mail box address in accumulator B passes through the selector to the Address Register 708 from whence it is applied to the MSU. Field 3 contains a function code which instructs the MSU that the operation to be performed is to read two words. The value from field 3 is applied through function selector 706 to the function register 708 from whence it is applied to the MSU. The MSU then reads CAW0 and CAW1 into one of the MSU In Registers 600.

The CSLSAD field contains the address in LS 504 at which the mailbox address is to be saved. A feature of the IOP is that when it takes CAW0 and CAW1 from a mailbox, it returns a condition code to the mailbox address from which CAW1 was taken to indicate than an order code has been successfully completed, a hardware fault detected, or some state of the CCM was encountered. The mailbox address is saved as the address to which the condition code is to be returned. The flow diagrams of FIGS. 11-18 show the generation of fault logging codes and condition codes only to enable the reader to correlate the flow diagrams with the microcode listing of the Appendix.

After CAW0 and CAW1 are read into an MSU In Register 600, the CCM executes a command to see if the pipeline is busy, i.e. whether the CCM-CM or CCM- MSU interface is busy. The instruction (step 1110) is repeated until the pipeline is no longer busy and then the CCM executes a shift command (step 1112) which transfers CAW0 from the MSU In register 600 through selector 604 and over leads 650 to selector 513. Field 1 of the command contains the value zero so CAW0 passes through selector 512 to selector 514. Field 2 of the command contains the binary value 2 hence selector 514 is enabled to pass CAW0 through the selector to the shifter 542. Since bit 1 of field 2 is a zero, selector 544 is enabled to pass a constant value on leads 340 from the control store CNSTNT latches 304 to the shift control input of shifter 544. The constant value contained in the command for controlling the shift has the value 9 hence CAW0 is circular left-shifted nine places thereby placing the order code in bits 27-35. The shift command enables selector 540 and CAW0 passes through the selector and is stored in ACM B since field 4 of the command specifies this accumulator register.

The command which moves CAW0 to ACM B contains in its NCSADR field the address of an ALU type command. The ALU command masks off the order code field of CAW0 (now.in ACM B) and places the order code in ACM A. The constant 0777* from the command is routed from latches 304 over leads 340 and through selector 500 to the B inputs of ALU 502. CAW0 passes from ACM B through selector 512 to the A inputs of ALU 502. Field 3 of the command produces signals on lead 380 which cause the ALU to take the logical AND of the values on its inputs. The output of ALU 502, which is the right justified order code, is routed through selector 540 to ACM A.

The next command read from CS 300 addresses location 565* in LS 504 and reads the value therein into the LS output register 520. The value read from location 565* is a Device Status Available value which has the zero bit set.

The CNSTNT field of the command contains the value 23 which is used to test (step 1114) the order code from CAW0 to see that it is not an invalid order code, i.e. greater than 22. Field 1 of the command enables selector 512 so that the order code is routed from accumulator A through selector 512 to the ALU A. Field 2 of the command enables selector 500 so that the CNSTNT value 23 from latches 304 is routed through the selector to ALU B. Field 4 of the command causes the ALU to subtract the B input from the A input and the result is routed through selector 540 to ACM B. The next command tests ACM B for a negative value and also transfers the Device Status Available value from LS output register 520 through selector 500, ALU 502 and selector 540 to ACM B. The testing of ACM B is accomplished by the branch field of the command which is applied to select circuits 316 together with bit 4 of ACM B.

Assuming the order code is valid, the UPI routine branches to a SPL command which calls for a branch on the order code field. CAW0 and CAW1 have been retained in the MSU In Register 600 and the SPL command gates the order code through MSU selector 604 and over leads 670 and Y (FIG. 3) to the Select 7X circuits 314. The branch field of the command gates the order code through circuits 314 and branch logic circuits 324 to the B inputs of adder 320. The order code is added to NCSADR and the resulting address is passed from adder 320 through selector 308 to the address register 302 to address CS 300 and read therefrom the first command of the SIOF Routine.

The foregoing detailed explanation of the UPI routine should familiarize the reader with the way in which the microcode listing of the Appendix is interpreted. Therefore, the following routines are described in functional terms only and the reader may consult the Appendix for details.

SIOF Routine

Figure 12A:
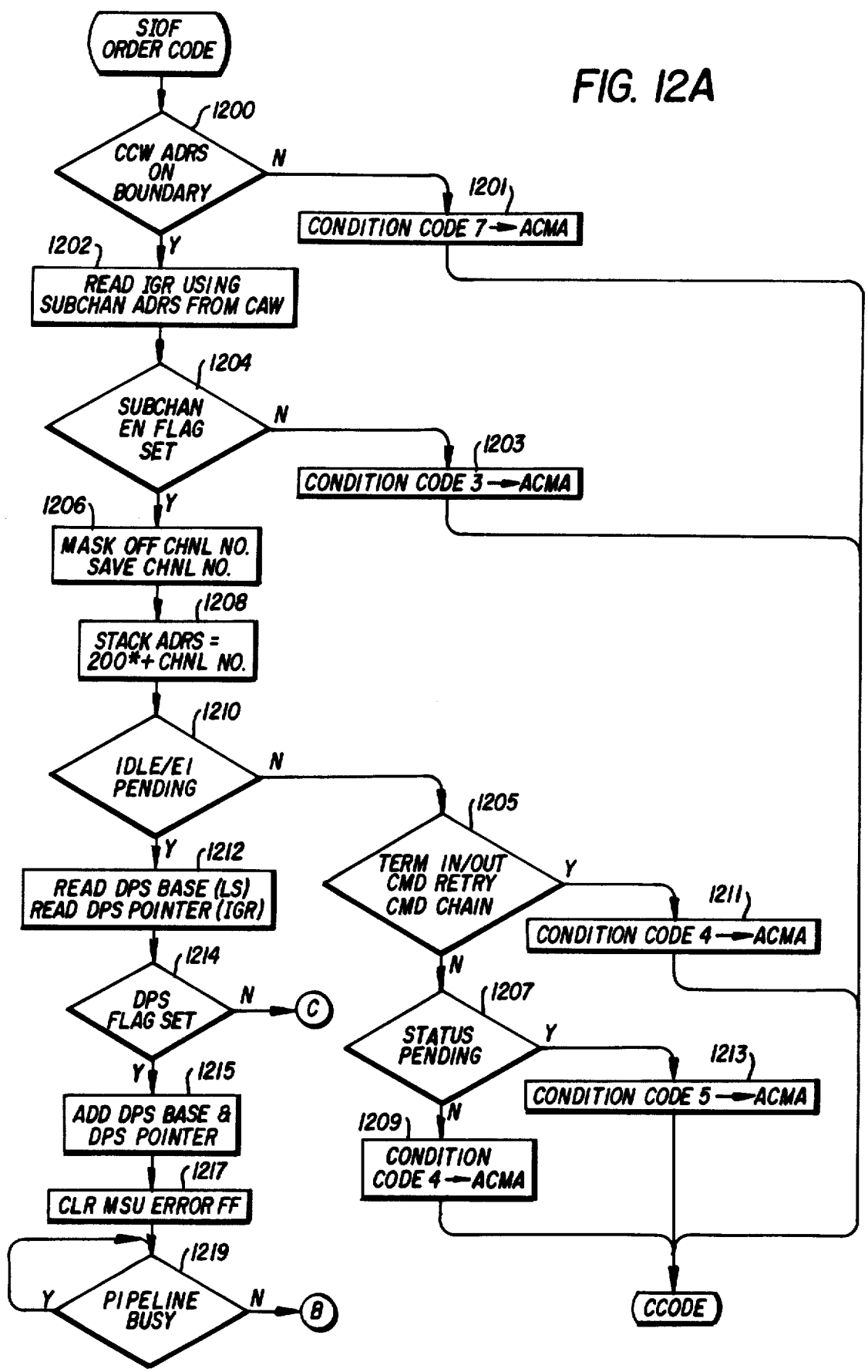
FIGS. 12A and 12B comprise a flow diagram illustrating the SIOF Order Code routine.
Figure 12B:
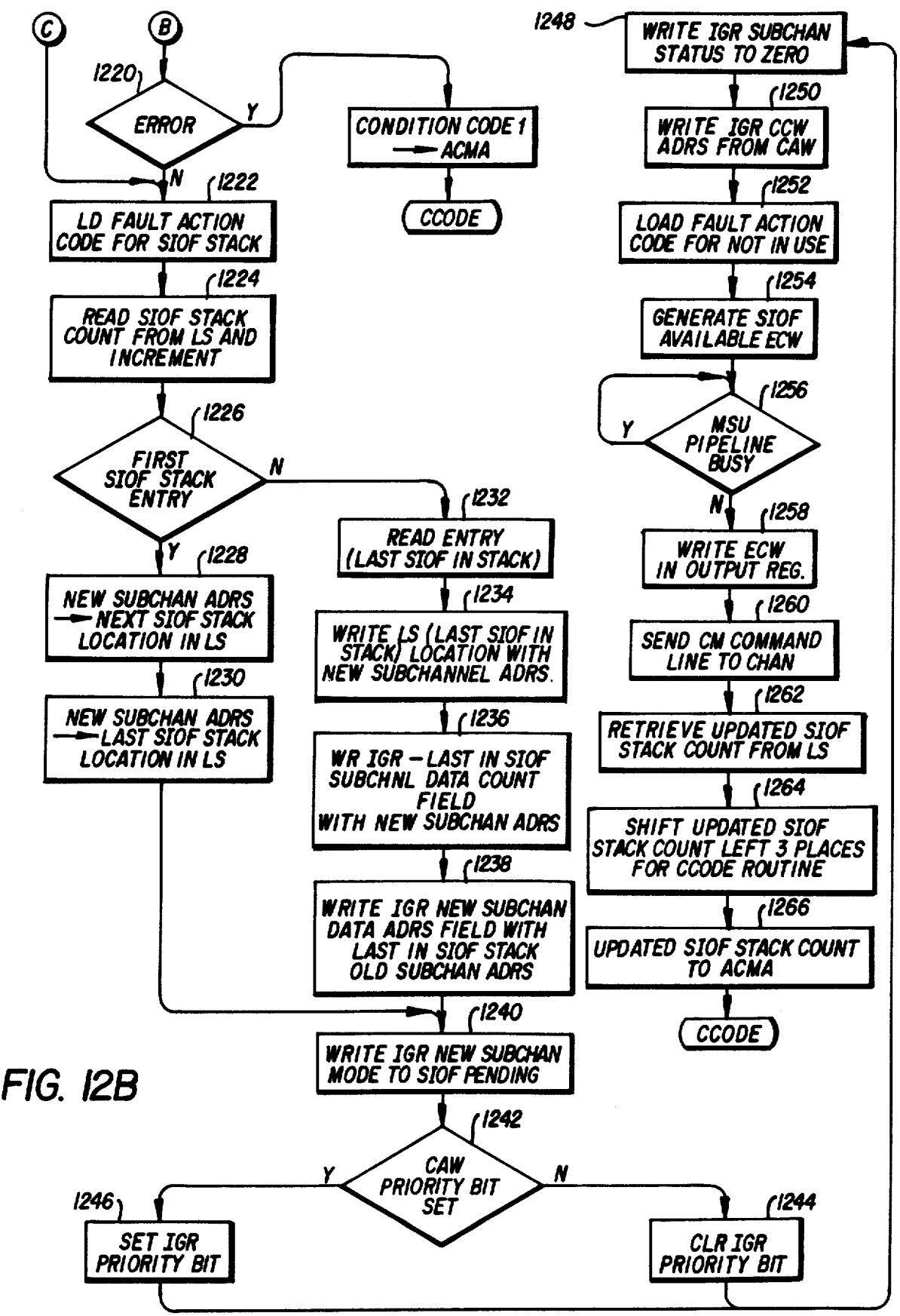

The SIOF order code routine shown in FIGS. 12A and 12B processes an SIOF CAW by making validity checks, saving the CCW address and the priority bit from CAW1 in IGR, and informing a channel by issuing an SIOF Available Command Exchange Control Word having the format shown in FIG. 8M.

There are 64 SIOF stacks in the IOP and the stacks are accessed by using the 6-bit channel number (channel module number and interface channel number) defined in the channel descriptor table. The channel descriptor table has an entry including information as shown in FIG. 8O for each subchannel and is addressed using a subchannel address. LS 504 and IGR 400 share the SIOF stack links. As shown by the partial LS memory map of FIG. 10, addresses 000*-077* store a table (1000) of addresses, one for each stack and each indicating the address of the next SIOF request in its associated stack. Addresses 100*-177* store a table (1002) of addresses, one for each channel, with each address specifying the address of the last SIOF request in its associated stack. Addresses 200*-277* store a table (1004) of values, one for each stack, with each value designating the number of entries in the corresponding SIOF stack. In IGR 400, the subchannel data address field contains the link to the next subchannel in that channel's SIOF stack (i.e. pointer 204 in FIG. 2A) while the subchannel data count field contains the link to the previous subchannel (i.e. pointer 206) in that channel's SIOF stack. The data address field and data count fields are used for other purposes during data transfers hence the names applied to them.

The first step (1200) of the SIOF Order Code Routine is to check the CCW address in CAW1 to see if it falls on a two-word boundary. CAW1 is routed from the MSU In Register 600 through selectors 604 and 512 to ALU A and from the ALU through selector 540 to ACM B and ACM D. Next, the next command transfers CAW1 from ACM D to LS 504 where it is saved at address 663*.

The next command reads CAW0 from the MSU In Register 600 through selectors 604 and 512 to the A inputs of ALU 502 where it is ANDed with the constant value 7777* obtained from the CNSTNT field latches 304. This masks off the subchannel address which is then passed through selector 540 to ACM C and ACM D. A test is made on the low order bit of the CCW address in ACM B to see if it is on a two-word boundary. If it is not, the program branches off to send a condition code to the location in MSU from which CAW was read.

Assuming the CCW address is on a two-word boundary then, at step 1202 the subchannel address from ACM D is saved at address 1445* in LS 504. The subchannel address from ACM C is routed through address selector 414 to the IGR Address Register 416 to read the subchannel registers from the IGR array 400 into the registers 401-412.

At step 1204 the Subchannel Enable flag is tested by the branch field of a command. The Subchannel Enable Bit is applied from the Subchannel Descriptor Register 409 over leads 460 and Z to the Select 1X-5X circuits 316. If the Subchannel Enable Bit is set an output is produced from circuits 316 which passes through the branch logic 318 to the carry input of adder 320. Thus, instead of taking the next command from NSCADR, the next command is taken from NCSADR+1 which stores a command that masks off and saves the channel number.

At step 1208, a word in the CCW pointer format (FIG. 8H) is read from the IGR registers through selectors 512 and 514 to the shifter. The CNSTNT field of the command contains the value 18 which is routed through selector 544 to circularly shift and right justify the upper half of the word. The pointer then passes through selector 540 to ACM A.

The CCM then masks off the channel number (channel module number and channel interface number) from the six low order bits of the word in ACM A. A constant with the value 077* is routed over leads 340 and through selector 500 to ALU B. ACM A is routed through selector 512 to ALU A and the ALU performs an AND operation with the resulting channel number being routed through selector 540 to ACM B and ACM D. ACM D is then saved at address 660* in LS 504.

The channel number is added to the base address (200*) of the SIOF Queue Count Table 1004 to obtain the table entry address for the channel. The value 200* from the CNSTNT field is routed over leads 340 and through selector 500 to ALU B while the channel number in ACM B is routed through selector 512 to ALU A. The two values are summed to obtain the entry address in the SIOF Queue Count Table and the resulting address is passed through selector 540 and entered into ACM C.

At step 1210 a branch field of a command tests the subchannel mode and branches to generate a condition code indicating the channel mode if the channel is not idle or there is not an EI/Unit Check Device End pending. The outputs from the Subchannel Mode Register 406 are applied over leads 470 and X to the 6X Select circuits 312 which also receive the code from the branch field latches 304. Depending upon the value of the three low order bits in the Subchannel Mode Register, one of eight different values is generated by select circuits 312 and routed through circuits 324 to the adder 320 where they are added to the NCSADR field of the command. The resulting address passes through selector 308 to the address register 310 to address CS 300 and obtain the next command.

Assuming that the Subchannel Mode Register indicates that the channel is idle (Mode=0000) or is in an EI pending mode (1000), the operations at step 1212 are executed to prepare for device path selection, a feature which is not pertinent to the present invention. At step 1214 a command is executed which contains in its branch field a code to test the Device Path Select flag (bit 7) in the Subchannel Descriptor Register 409. This flag is loaded by an order code generated by IP 100 but for purposes of the present explanation it may be assumed that the Device Path Select flag is not set.

Assuming the Device Path Select flag is not set then the SIOF Order Code Routine proceeds to step 1222 (FIG. 12B) where a fault action code is loaded into a fault log memory (not shown) where it is saved for error recovery procedures. The CCM is now ready to add the SIOF request to the SIOF stack.

At step 1224 the SIOF Queue Count entry address placed in ACM C at step 1208 is routed through selector 506 and address register 522 to address LS 504 and reads out the stack count for the channel.

The stack count is applied to ALU B through LS output register 520 and selector 500 while the ALU A inputs receive the value 0. Field 3 of a command controls the ALU to sum A+B+1 thereby incrementing the SIOF stack count by 1. The incremented SIOF stack count then passes through selector 540 and is stored in ACM A and ACM D.

At step 1226 the incremented stack count for the SIOF stack is written back into its entry in the stack count table 1004 in LS 504. The entry address in ACM C is routed through selector 506 to address register 522 to address LS. The incremented count is passed from ACM D to the data inputs of LS. The stack count in ACM A is checked to see if this is the first entry in the stack.

Assuming that the entry is the first one in the SIOF stack, then at step 1228 the new stack count is saved in LS address 661*, the channel number moved from ACM B to ACM C, and the new subchannel address is entered into the Next SIOF location (table 1000) in LS.

The selector 512 is enabled to pass a word in the subchannel address mode (FIG. 8I) and this word is passed through the selector to ALU A. The ALU ANDs the word with the constant 7777* applied to ALU B. The subchannel address is masked off and passed through selector 540 to ACM A and ACM D. The channel number in ACM C is used to address LS 504 and the subchannel address in ACM D is written into the table 1000 of next SIOF requests in the channels.

At step 1230, the subchannel address is entered into the table 1002 of last SIOF stack addresses. The address of the table entry for the active channel in the table of subchannel addresses for the last SIOFs in the stacks is generated by adding the CNSTNT 100* to the channel number which is in ACM B. The resulting table entry address is entered into ACM C for addressing the LS.

If the test at step 1226 shows that the SIOF order code received from the MSU is not the first SIOF to be placed in the stack for the given channel, the program proceeds to step 1232 where the constant value 100* is added to the channel number in ACM B to obtain the entry address into the last SIOF in channel stack 1002 and the generated entry address is entered into ACM C while the new count generated at step 1224 is stored in LS. The entry address in ACM C accesses LS 504 to read the Last In Stack Subchannel address from table 1002 into the LS Output Register 520. At the same time, the subchannel address is placed in ACM A and ACM D. Selector 512 is enabled to pass a word in the subchannel address format (FIG. 8I) from the IGR registers to the ALU 502 where the subchannel address is masked off and then passed through selector 540 to ACM A and ACM D. The subchannel address in ACM D is then written into table 1002 in LS 504 as the new Last In Stack Subchannel address.

At step 1236 the next pointer (see FIG. 2A) for the previous entry in the stack is loaded with the new subchannel address to provide a link between the newest request and the previous one. The previous subchannel address is passed from the LS Output Register 520 through selector 500, ALU 502 and selector 540 to ACM C. ACM C is then utilized to address the IGR array 400 and the new subchannel address is routed through selectors 418 and 420 to the format selectors 422, the input to selectors 422 having the format shown in FIG. 8B. The format selectors are enabled so that the next subchannel address is written into the data address field of the IGR array.

At step 1238 the previous pointer (see FIG. 2A) for the newest entry in the queue is loaded with the subchannel address of the previous Last In SIOF Stack. The previous last in stack subchannel address is moved from ACM C to ACM D and the new subchannel address is moved from ACM A to ACM C. The subchannel address for the previous stack entry is applied through data selectors 418 and 420 to the format selectors 422 while the new subchannel address in ACM C is passed through selector 414 to the IGR Address Register 416. The data applied to the format selectors 422 has the format shown in FIG. 8A and the format selectors are enabled so that the subchannel address for the previous entry in the stack is written into the data count field of the new entry as the previous pointer (see FIG. 2A).

The routine proceeds from step 1230 or step 1238 to step 1240 where the code 0101 is written into the Subchannel Mode field of the IGR array 400 to indicate that an SIOF is pending. If the program proceeds from step 1230 to step 1240 the new subchannel address is not in accumulator C so ACM A is transferred to ACM C. At the same time, CAW1 is read from LS 504 through selector 500, ALU 502 and selector 540 to ACM A in preparation for a priority bit test. ACM A is then read through selector 512 and selector 514 to shifter 542 where CAW1 is left-shifted one position and the result passed through selector 540 to ACM B. This places the priority bit in bit 35 of ACM B for testing. However, prior to the test the subchannel address in ACM C is used to address IGR array 400 and data in the format shown in FIG. 8B is applied to the array. A command supplies the constant value 0101\* (SIOF pending) and field 3 specifies Mode so that bits 40–43 comprising the constant are written into the subchannel mode field in the IGR array.

Next, at step 1242 the priority bit from CAW1, now in bit 35 of ACM B, is tested to see if it is set or not set. This bit is used as an indicator as to whether or not the IOP is to interrupt the IP after a status table entry is made for this operation. The IGR Array Registers are read in the CCW address format (FIG. 8G) and the priority flag either set or reset as required in the ALU with the result being entered into ACM D. ACM C then addresses the IGR array and the contents of ACM D are applied to the data input of the array in the status flag format illustrated in FIG. 8C. This writes the flags back in IGR with the priority bit either set or reset as required.

At step 1248 the Subchannel Status field in the IGR array is written to zero. CAW1 is transferred from ACM A to ACM D and ACM D, reformatted as shown in FIG. 8B, is applied to the data input of the IGR array. The array is energized in the Subchannel Status Write mode and since the constant field is zero the Subchannel Status field is written to zero. Next, CAW1 from ACM D is applied to the data inputs of the IGR array in the format shown in FIG. 8A and the array is energized in the CCW Address Write mode to write the CCW address from CAW1 into the CCW address field of the array.

Step 1252 merely loads a fault action code into the IGR array and is not relevant to the present invention.

At step 1254 the CCM generates a command ECW having the format shown in FIG. 8M. Actually, this ECW comprises the subchannel address in ACM C. At step 1256 the MSU pipeline is tested and if it is busy the test is continued until the pipeline is not busy. At this time the command ECW (subchannel address) in ACM C is routed through word selector 606 to the Control Word Register 612. Since the 24 high order bits of ACM C are zero, the Function Code field (FC) of the word loaded into register 612 is zero to indicate an SIOF Available. At step 1260 the subchannel address is routed through selector 614 to the channel module drivers 616.

After the command ECW is applied to the channel drivers the CCM energizes a CM command line (not shown) corresponding to the CM 114, 114a which is to accept the command ECW. There is a command line for each CM and the particular command line which is enabled is determined by decoding the channel module number field of the CMOD latches 410. The CCM also decodes the interface number field (I) of the CMOD latches and applies these signals over leads 465 to all of the CMs, the interface number being accepted only by the CM which receives the signal on the command line.

The SIOF Order Code Routine next prepares for sending a condition code to the MSU where it is entered into the location from which CAW1 was read. At step 1262 the updated SIOF stack count is retrieved from LS, at step 1264 the stack count is left-shifted to place it in the proper bit positions, and at step 1266 the updated SIOF stack count is moved to ACM A. The SIOF order code then branches to the Condition Code (CCODE) Routine which sends the condition code to the MSU.

Meanwhile, the command ECW sent to the CM sets a flip-flop therein to indicate which CM interface (i.e. interface with subsystem) has been selected. At this time the interface may be busy communicating with any of the control units on its daisy chain. At some later time, when transmission over the interface is completed, the set condition of the flip-flop causes the CM to apply to the CCM a Command Module Exchange Control Word (CM ECW) having the format shown in FIG. 8N. The CM also energizes its SIOF request line to the CCM.

Figure 3:
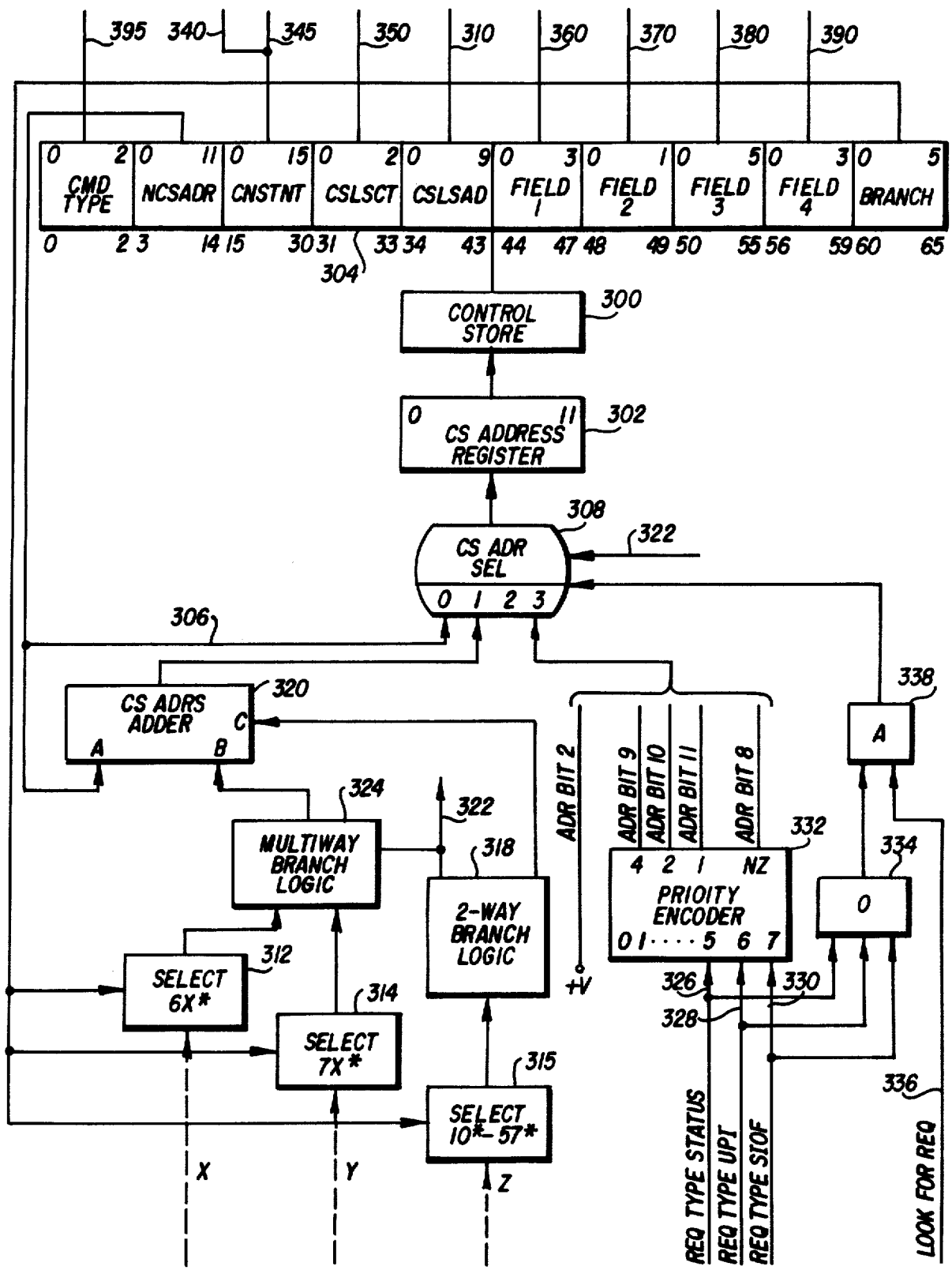
FIGS. 3-7, when arranged as shown in FIG. 9, comprise a block diagram of a central control module.

The CM ECW from the CM is applied to the CM In Selector 618. When the CCM priority network 580 determines that the SIOF request from the CM has the highest priority of all of the data, SIOF and UPI requests applied to the priority circuit, selector 618 is energized and the CM ECW is passed through the selector to the CI Data Register 620. At the same time, the CI interface number field and the CI word control field of the CM ECW are loaded into the registers 622 and 624. In FIG. 3, the SIOF request causes the priority encoder 332 to generate address 1017\* which is applied to CS 300 to read out the first command of the Channel SIOF Request Routine.

CHANNEL SIOF REQUEST ROUTINE

Figures 13, 18B:
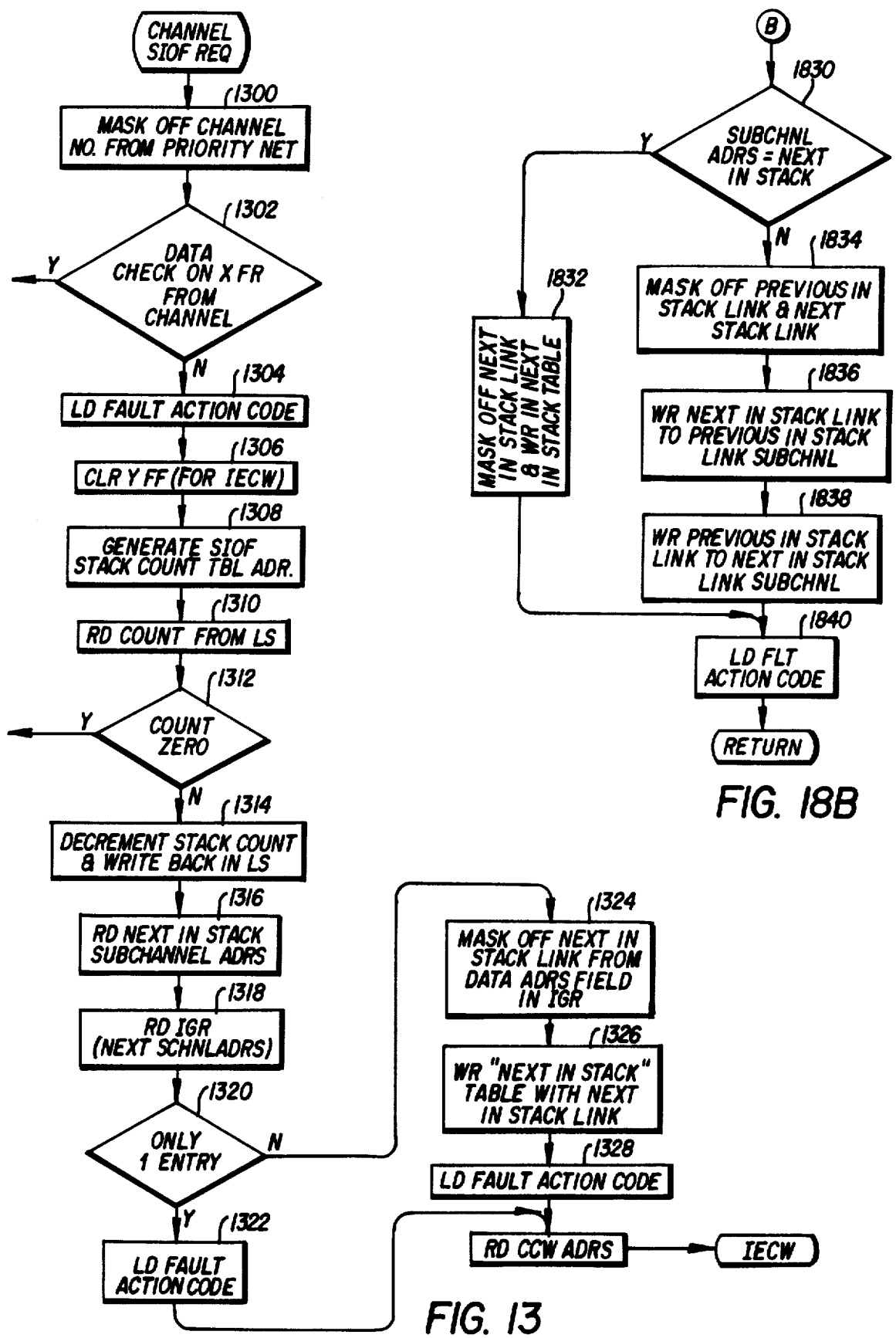
FIG. 13 is a flow diagram illustrating the Channel SIOF Request routine.

The Channel SIOF Request Routine is illustrated in FIG. 13. Briefly, this routine examines the appropriate SIOF stack and, if the stack is not empty, updates the stack. The next subchannel's information is retrieved from IGR and the routine exits to an Initiate Exchange Control Word (IECW) Routine.

The Channel SIOF Request Routine begins at step 1300 by passing the channel number of the channel granted priority through selector 512 and ALU 502 to ACM A and ACM D. The channel number is then saved at LS address 660\*.

At step 1302 a check is made for errors and assuming no errors a fault action code is loaded into a fault action memory at step 1304. At step 1306 the Y flip-flop is cleared as a flag for use in the IECW routine which is to follow. The X and Y flip-flops are used as flags by the various routines.

At step 1308 the channel number in ACM B is added to the constant 200* and the result used to generate the address of an entry in the stack count table 1004. At step 1310 the generated address is utilized to read the stack count for the channel and at step 1312 the stack count is checked for a zero value. The stack count should not be zero so at step 1314 the stack count is decremented by one and written back into LS.

At step 1316 the channel number addresses LS to read from table 1000 the subchannel address of the next SIOF in the channel stack. The subchannel address thus obtained is then used at step 1318 to read the IGR array 400 into the registers 401-412. The stack count read from LS at step 1310 is checked at step 1320 to see if it is a one thereby indicating that the entry is the only entry in the stack. If it is, then the stack links do not need to be updated so a fault action code is loaded at step 1322 and the routine proceeds to step 1330.

If the test at step 1320 indicates that there are additional entries in the SIOF stack for this channel then the stack pointer must be adjusted. A word in the DT ADR format (FIG. 8F) is read from IGR using the next in stack subchannel address obtained at step 1316. The word passes through selector 512 and is shifted to right justify the next in stack link which is read from data address latches 402. At step 1326 the channel number is utilized to write the next in stack link into table 1000 in LS as the next in stack pointer.

At step 1328 a fault action code is loaded and at step 1330 a word in the CCW ADR format (FIG. 8G), obtained from the subchannel address corresponding to the SIOF request, is gated through selector 512 and ALU 502 to ACM C for use in the IECW routine. The program then proceeds to the IECW routine which is not shown. This routine uses the CCW address to read a CCW from the MSU 104 into the CCM 112 which then passes the CCW with an Initiate Exchange Control Word (IECW) to the channel module specified by the CMOD number field at the subchannel address from which the CCW address was read. Actually, the module number does not come directly from the IGR latches. For pipelining purposes a saved data stack (not shown) is provided. When an MSU request is made this memory saves all of the information required to complete the request. Included in the saved data is the subchannel address, channel module number and interface number from IGR.

Upon receiving the IECW the CM sends the command out to the designated control unit such as control unit 106. Assuming that the control unit is not busy it then begins making data transfer requests and a data transfer operation is initiated between MSU 104 and the control unit through the circuits shown in FIG. 6.

However, if the control unit 106 is busy it formulates a status word which is sent back to the CM 114. The CM then issues a status request to the CCM for the purpose of transferring thereto a CM ECW (FIG. 8N) and a CM status word (FIG. 8P). The status word (EDW 0) contains a busy status code in bits 28-35 and bit 18 is set to indicate that the device status field contains a valid device status. The system is designed to always provide for a three-word transfer where one of the words is an ECW. All three words may not be transferred. Bits 7 and 8 of the CM ECW indicate whether EDW 0 or EDW 1 or both of them is/are valid. For a CM status request, EDW 1 is not valid (i.e. not utilized).

When the priority network 580 in the CCM grants priority to the status request, a signal from one of the leads 582 is applied over lead 326 to the priority encoder 332 of FIG. 3 which generates the starting address (1015*) of the Status Request Routine. At the same time, the priority network 580 enables selector 618 so that the words from the CM may be passed into the CCM. The word control and interface number fields of CM ECW are saved in registers 624 and 622 and the subchannel address field is passed through register 620 and selector 414 to the IGR Address Register 416 to read out the IGR array. EDW 0 is then passed through register 620 and entered into register 630.

STATUS REQUEST ROUTINE

The Status Request Routine is shown in FIGS. 14A and 14B and begins at step 1400 by saving EDW 0 and EDW 1 (all zeros) in LS 504. A mask word is read from LS and at step 1402 a check is made for any faults. In addition, the Subchannel Enable Bit from the Subchannel Descriptor Register 409 is tested to see if it is set. If there are no faults and the subchannel is enabled the routine proceeds to step 1404 where the device status field of EDW 0 is compared with a device status mask word from LS. At step 1406 the masked status is tested to see if EDW 0 contained a status field indicating Control Unit Busy.

If the status is Control Unit Busy then at step 1408 the Transparent Control Unit Busy (TCUB) bit in the subchannel descriptor latches 409 is tested to see if the Transparent Control Unit Busy feature is enabled for this subchannel. TCUB should be enabled for block MUX channel modules so the Status routine branches to the Block MUX Transparent Control Unit Busy (BMTCUB) Routine illustrated in FIGS. 15A-15D.

At step 1406, if the status contained in EDW 0 is not control unit busy status the routine branches to step 1410 where the subchannel status is read from latches 411 and tested for the idle mode. If the subchannel status is not idle the routine branches to FIG. 14B where bit 18 of EDW 0 (FIG. 8P) is tested. This bit will be set if there is valid status in bits 28-35 of EDW 0. Assuming that the Device Status Available Bit is set, then at step 1420 the device status is saved at LS 1437*. At step 1422 the IGR array 400 is addressed to obtain the channel type which is applied over leads 465 and leads X (FIG. 3) to the 6X* selector 312. The routine branches depending upon the value which represents the type of channel module. If the CM is a block multiplexer channel module the program proceeds to step 1424 where the status presented by the CM in EDW 0 is tested for a control unit end (CUE). If the status is CUE then the control unit busy stack must be linked to the top of the SIOF stack. This is accomplished at step 1426 by the ACW$CUBRLNK routine subsequently described.

After the stacks have been linked the routine returns to FIG. 14B where, at step 1428 the status reported in EDW 0 is tested for CUE only. If the status is CUE only the at step 1430 the CCM sends an accept status ECW to the CM using the channel module number from the priority network 580.

In FIG. 14A, if the test at step 1414 indicates an idle mode then the IGR is read and the channel type from latches 410 is applied to the 6X* select circuits over leads 465 and X (FIG. 3). Assuming the type field contains a value indicating a block MUX channel the program branches to the Block MUX Status Routine (BJ$BM) shown in FIG. 17.

BLOCK MUX TRANSPARENT CONTROL UNIT BUSY ROUTINE

The BMTCUB routine begins at step 1500 in FIG. 15A. The channel number from CMOD latches 410 is added to the constant 1300 and the result used to address and read out the channel's entry in the control unit busy table 1300. After a fault action code is written at step 1502 bit 4 of the word read from the control unit busy table is tested at step 1504 to see if the SIOF stack is already in the control unit busy mode. Assuming that it is, then the control unit busy stack must be updated. At step 1506 the channel number is added to the constant 1100* and the result used to address the CUB stack count table 1010. The queue count for the CUB table is read out of LS, incremented and written back into LS. At step 1508 the channel number is added to the constant 400* and the table 1008 is addressed to read out the subchannel address of the last CUB in the stack. The subchannel address thus read out is temporarily held in the LS Output Register 520. The subchannel address which was received from the channel module with the CUB status has been retained in the IGR Address Register and it is transferred to ACM A and ACM D. ACM D is then written into the LS array as the new last in CUB stack pointer.

At step 1512 the next and previous links of the CUB stack are updated. The subchannel address of the old last in stack is read from the LS Output Register 520 to ACM C where it is used to address the IGR array and write the new subchannel address into the data address field of the array as the pointer to the next CUB for the previous entry in the stack.

The previous last in stack address is transferred from ACM C to ACM D and written into the IGR array data count field as the previous stack link pointer. The subchannel address in ACM A is moved to ACM C for the purpose of addressing the IGR array. This completes the writing of the next and previous links in IGR as represented in the flow diagram by step 1512.

At step 1514 the subchannel address is moved from the LS Output Register 520 to ACM C and used to address the IGR array and the binary value 1101 written into the subchannel mode field to indicate Control Unit Busy status.

At step 1516 the CCW address is read from the latches 403, decremented by two, and written back into the IGR CCW address field. This is done because two CCWs are read from the MSU during the IECW routine and the CCW address is incremented by two during that routine so that it will be conditioned to address the MSU for the next two CCWs.

At step 1518 the pipeline is tested until it is no longer busy and at that time the routine proceeds to step 1520 in FIG. 15D where the CCM generates and sends an Accept Status ECW to the channel module.

At step 1522 EDW 0 is read from register 630 through the ALU where bit 30 is tested to see if the status being presented is Control Unit End status. If it is not, the BJ$BMTCUB routine is complete and the program branches to the Look For Request Routine to look for another request. On the other hand, if Control Unit End status is being presented it means that a control unit terminated its operation and may be available to execute those SIOFs which resulted in Control Unit Busy status while the control unit was busy. Therefore, from step 1522 the routine branches to the ACW-$CUBRLNK subroutine (FIGS. 16A-16C) at step 1524 to link the CUB stack to the top of the SIOF stack. After the subroutine is completed the program returns to FIG. 15D and branches to look for another request.

Actually, step 1524 is executed only if the subsystem control unit sends to the CCM a status word having the format shown in FIG. 8P with bits 30 and 31 both set. Bit 30 is the control unit end status bit while bit 31 is the control unit busy bit. The control unit presents the combined CUB/CUE status only when it receives a command on the control unit cycle immediately following deactivation of an external interrupt (EI) control signal from the control unit to the channel module. The control unit in this case rejects the command because of the command/EI collision as explained in the above-referenced patent to Robert E. Swenson.

Returning to FIG. 15A, if the test at step 1504 indicates that bit 4 of the stack mode table entry is not set it means that the present Control Unit Busy is the first one to be entered into the CUB stack. The routine branches to FIG. 15B where, at step 1526 where the address generated at step 1500 is utilized to write bit 4 of the stack mode location in table 1012 to thereby indicate the CU Busy mode.

At step 1528 EDW 0 is read from the register 630 through selector 512 and ANDed with 40* in the ALU to check the CUE bit. If the status being reported is not CUE it means that the present CUB is to be entered into the CU busy stack as the only entry thereon. At step 1530 the channel number is added to 1100*, LS 504 addressed with the result, and the value 1 entered into the CUB stack count table 1010 to update the count. Since this is the only entry, the tables 1006 and 1008 are accessed and at step 1532 the subchannel address is written into the tables as both the next and last pointers for the CU busy stack.

Figure 15B:
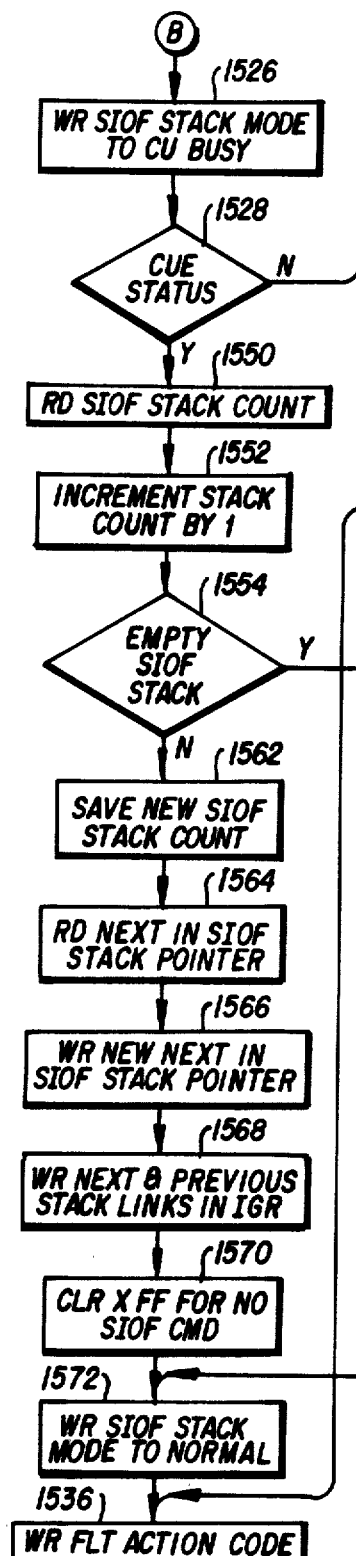
Figure 15C:
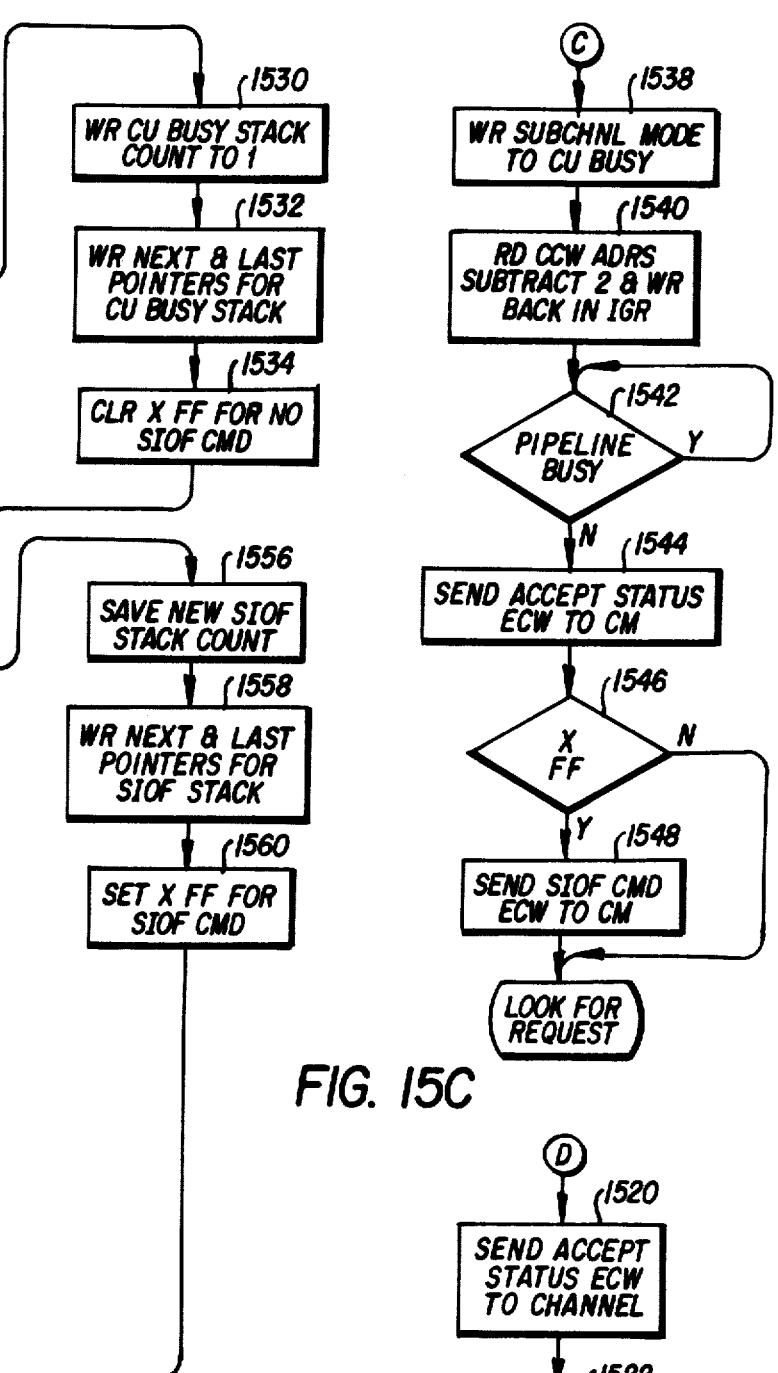
Figure 15C:
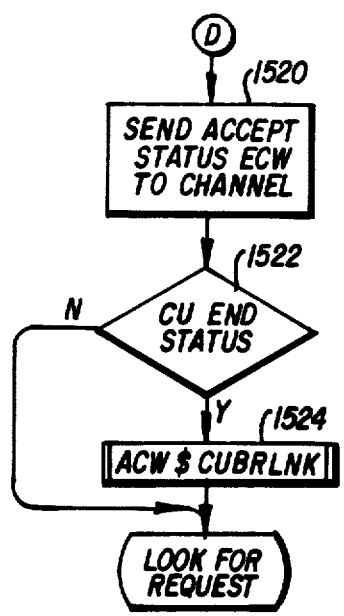

Step 1534 clears the X flip-flop for No SIOF command, step 1536 writes a fault action code and the routine proceeds to step 1538 in FIG. 15C.

At step 1538 the subchannel mode field of the IGR array is written to 1101 to indicate CU Busy mode. At step 1540 the CCW address is read from latches 403, the value decremented by two and the result written back into the CCW address field of the IGR array 400.

At step 1542 the pipeline is tested until it is no longer busy and at that time the routine proceeds to step 1544 where it sends an Accept Status ECW to the CM. At step 1546 the X flip-flop is tested and since it was cleared at step 1534, the subroutine exits to the Look For Request Routine.

When the BJ$BMTCUB Routine is called from the Status Routine as a result of a status request which is for the purpose of reporting both Control Unit Busy status and Control Unit End status, an entry is not made into the CUB stack if it would be the first entry therein. Instead, the entry is made into the SIOF stack.

In FIG. 14A the reported Control Unit Busy status is detected at step 1406 and with TCUB enabled the program proceeds to the BJ$BMTCUB Routine of FIG. 15A. At step 1504 the routine detects that there are no entries in the control unit busy stack and branches to FIG. 15B where, at step 1528, it detects the reported CUE status. From step 1528 the routine proceeds to step 1550 where the SIOF stack count for the channel is read from table 1004. At step 1552 the SIOF stack count is incremented by one.

At step 1554 the SIOF stack count is tested to see if the present entry will be the only entry in the stack. If it will be, the routine saves the new SIOF stack count in table 1004 and at step 1558 the subchannel address is written into the SIOF stack next and last pointer tables 1000 and 1002.

At step 1560 the X flip-flop is set and at step 1572 the channel number is added to the constant 1300\* to generate an entry address in the stack mode table 1012. Bit 4 of the entry is cleared to indicate that there are no entries on the CU busy stack.

From step 1572 the routine proceeds through step 1536 and the steps shown in FIG. 15C as previously described, with one exception. Since the X flip-flop was set at step 1560 the test at step 1546 causes a branch to step 1548 where the CMM sends to the CM an SIOF command ECW.

Returning to step 1554, if the test indicates that the entry about to be placed in the SIOF stack will not be the only entry therein then the stack links must be adjusted. The stack count generated at step 1552 is returned to the queue count table 1004 for the SIOF stacks at step 1562. The channel number is added to the constant 200\* to obtain the entry address into the table and the incremented SIOF stack count is written therein.

At step 1564 the channel number is used to access table 1000 and read therefrom the subchannel address of the next SIOF in the stack. The subchannel address for the entry currently being made is then written into table 1000 as the next in SIOF stack pointer.

At step 1568 the subchannel address of the previous last in stack is written into the data count field in IGR as the pointer to previous link in the newest stack entry. The subchannel address of the current entry is written into the data address field of the IGR at the subchannel address of the previous last in stack entry as the pointer to next entry.

At step 1570 the X flip-flop is cleared and the routine then proceeds through steps 1572 and 1536 from whence it passes through the steps previously described with reference to FIG. 15C. Since the X flip-flop is clear, step 1548 is bypassed and no SIOF command ECW is sent to the CM.

ACW$CUBRLNK ROUTINE

The Control Unit Busy Relink Routine is illustrated in FIGS. 16A-16C. This routine is called to link the CU busy stack with the SIOF stack with the CU busy stack being placed on top. Thus, the routine essentially takes the stacks as illustrated in FIGS. 2A and 2B and links them together as shown in FIG. 2C. The routine begins at step 1600 by clearing the Y flip-flop and, at step 1602 checking bit 4 in LS 1436 to see if it is set. This bit is set to indicate an error in addresses and for purposes of explaining the present invention it may be assumed that the bit is not set. However, if it should be set then at step 1604 the Y flip-flop is set and the channel number from the priority circuit is masked off and saved.

Assuming that the test at step 1602 indicates no bad address then the routine jumps to step 1606 where the subchannel address received from the CM is masked off and saved. At step 1608 the channel number (i.e. channel module number and interface number) are masked off and added to the constant 1300\* to obtain an entry address into the stack mode table 1012. The entry is read from the table and after a fault action code is loaded at step 1610 the table 1012 is accessed and the stack mode for the channel tested at step 1612. If the Stack Mode bit is not set it means that there are no entries in the CU busy stack hence a relinking is not required. The saved subchannel address is used to read IGR at step 1614 to reload the current subchannel information into registers 401-412 and at step 1616 a fault action code is loaded. The routine then returns to the calling routine.

If the test at step 1612 indicates that there are entries in the CU busy stack then the control unit busy stack must be linked to the top of the SIOF stack. The routine branches to FIG. 16B where the channel number for the current status is added to the constant 200\* to obtain an entry address into the SIOF stack count table 1004. The count is read from the table and at step 1620 it is tested to see if the SIOF stack is empty. If the stack is empty then there is no need to adjust links between the CU busy stack and the SIOF stack. All that is required is that the control unit busy stack count be transferred to the SIOF stack count table 1004 and the entry in the last in control unit busy stack table 1008 be transferred to the last in SIOF stack table 1002. The program proceeds to step 1622 where the address for accessing table 1008 is generated, the subchannel address in the last in CU busy stack is read out, the last in SIOF stack table 1002 is accessed and the subchannel address read from the last in control unit busy stack table 1008 is entered into the last in SIOF stack table 1002. At step 1624 the CU busy count is read out of table 1010 and written into the SIOF stack count table 1004. The program then proceeds to step 1636.

If the test at step 1620 indicates that the SIOF stack is not empty then the CU busy stack is linked to the top of the SIOF stack. At step 1626 the pointers to the last in control unit busy stack and the next in SIOF stack are read from tables 1008 and 1000.

At step 1628 the subchannel address from the last in control unit busy stack is written to the previous link of the next in SIOF stack. This provides a backward link from the CU busy stack to the top of the SIOF stack.

At step 1630 the next in SIOF stack pointer is written to the next link of the last in CU busy stack thereby providing a forward link between the SIOF stack and the CU busy stack.

After the stacks are linked the tables 1004 and 1010 are accessed to obtain the stack counts for both sstacks. The counts are added together and the sum written back into the SIOF stack count table 1004.

From step 1624 or step 1634, the routine proceeds to step 1636 where the next in CU busy stack is read from table 1006 and at step 1638 the address read from the table is written into the next in SIOF stack table 1000. This makes what was formerly the oldest entry in the control unit busy stack the oldest entry in the SIOF stack.

This completes the linking of the stacks except for the setting of the SIOF stack mode to normal. At step 1640 the CCM generates an SIOF available command ECW and tests the pipeline at step 1642. When the pipeline is no longer busy the routine proceeds to FIG. 16C where the Y flip-flop is checked at step 1644 to see if it is set. Unless a bad address was detected at step 1602 the Y flip-flop is not set so the routine proceeds to step 1646 where it sends the command ECW generated at step 1640 to the channel module using the channel number obtained from the IGR latches 410. If a bad address was detected at step 1602 then the Y flip-flop is set and the routine proceeds from step 1644 to step 1648 where the command generated at step 1640 is sent to the CM using the channel number derived from the priority circuits.

At step 1650 the SIOF stack mode for the channel is written to normal and at step 1652 the subchannel address saved at step 1606 is used to read the IGR array into latches 401-412. After loading a fault action code at step 1654 the ACWL$CUBRLNK Routine returns to the calling routine.

BLOCK MULTIPLEXER STATUS ROUTINE

Figure 17:
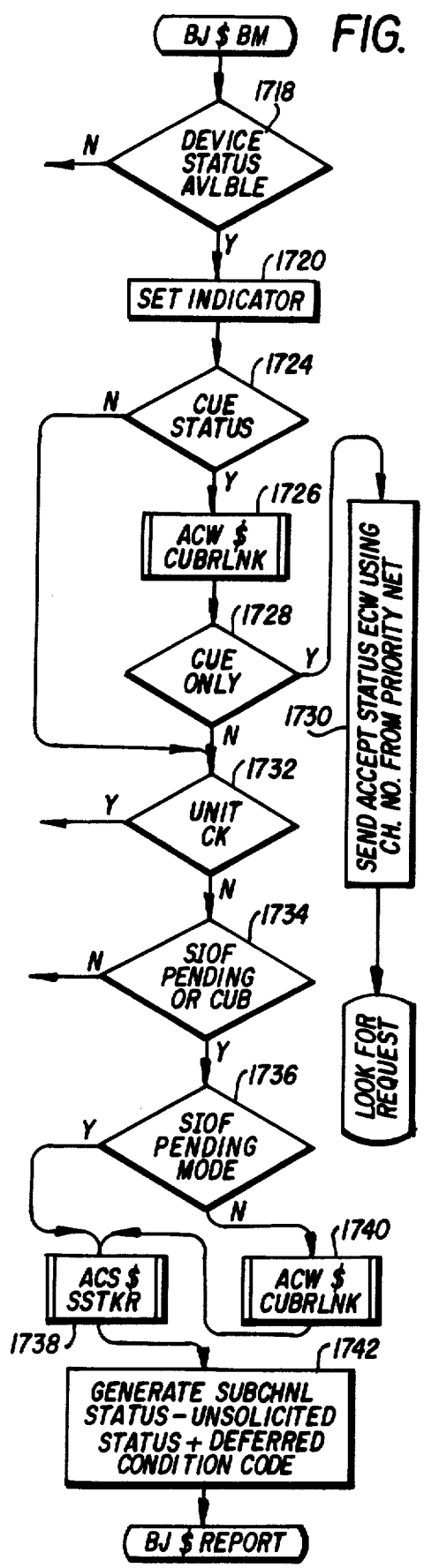
FIG. 17 is a flow diagram illustrating the Block Multiplexer Status Request routine; and, FIGS. 18A and 18B comprise a flow diagram of the SIOF Stack Relink routine.

The Block Multiplexer Status Routine (BJ$BM) is shown in FIG. 17. This routine is called as the result of a status request on a block multiplexer type channel where the status reported indicates that the reporting control unit is not busy (step 1406) and either the IGR subchannel status is zero (step 1412) or the IGR subchannel status is non-zero and the Subchannel Mode Register 406 indicates an idle condition (steps 1412 and 1414).

Steps 1718, 1720, 1724, 1726, 1728 and 1730 are similar to steps 1418, 1420, 1424, 1426, 1428 and 1430. However, if the test at 1724 indicates no control unit end status or the test at step 1728 indicates no control unit end only status then the routine proceeds to step 1732 where a test is made to see if the status reported from the control unit is unit check status. A control unit reports unit check status (bit 34 set in status word of FIG. 8P) when an unusual or error condition occurs in the control unit on a current or previous command. If unit check status is not detected at step 1732, the routine moves to step 1734 where the three lower order bits of the Subchannel Mode Register 406 are applied to the 6X* Select circuits 312. Since the SIOF pending status is 0101 and the control unit busy status is 1101, the routine branches to a given CS address if either of these modes is present. The command at this address, represented at 1736 checks for an SIOF pending mode. The contents of the Subchannel Mode Register 406 are applied to a decoder (not shown) which produces an output signal on one of several outputs depending upon the value stored in the register. The output signal from the decoder is applied to the select circuits 316 and is tested to cause a two-way branch depending upon whether the mode tested for is found to be true or false. If the condition is true then the program branches to a given address which calls the ACS$SSTKR subroutine at step 1738 to adjust the SIOF stack links. On the other hand, if the condition tested for at step 1736 proves false then the routine branches to the given address plus one and the command at this address calls the ACW$CUBRLNK routine at step 1740 to link the control unit busy stack to the top of the SIOF stack.

After completion of the routine at step 1740, the routine returns to step 1738, executes the ACS$SSTRK routine, and moves to step 1742 where the CCM generates subchannel status of unsolicited status +deferred condition code. The routine then branches to the BJ$ Report Routine (not shown) to report status in a status table or to report status to the UPI.

SIOF STACK RELINK ROUTINE

Figure 18A:
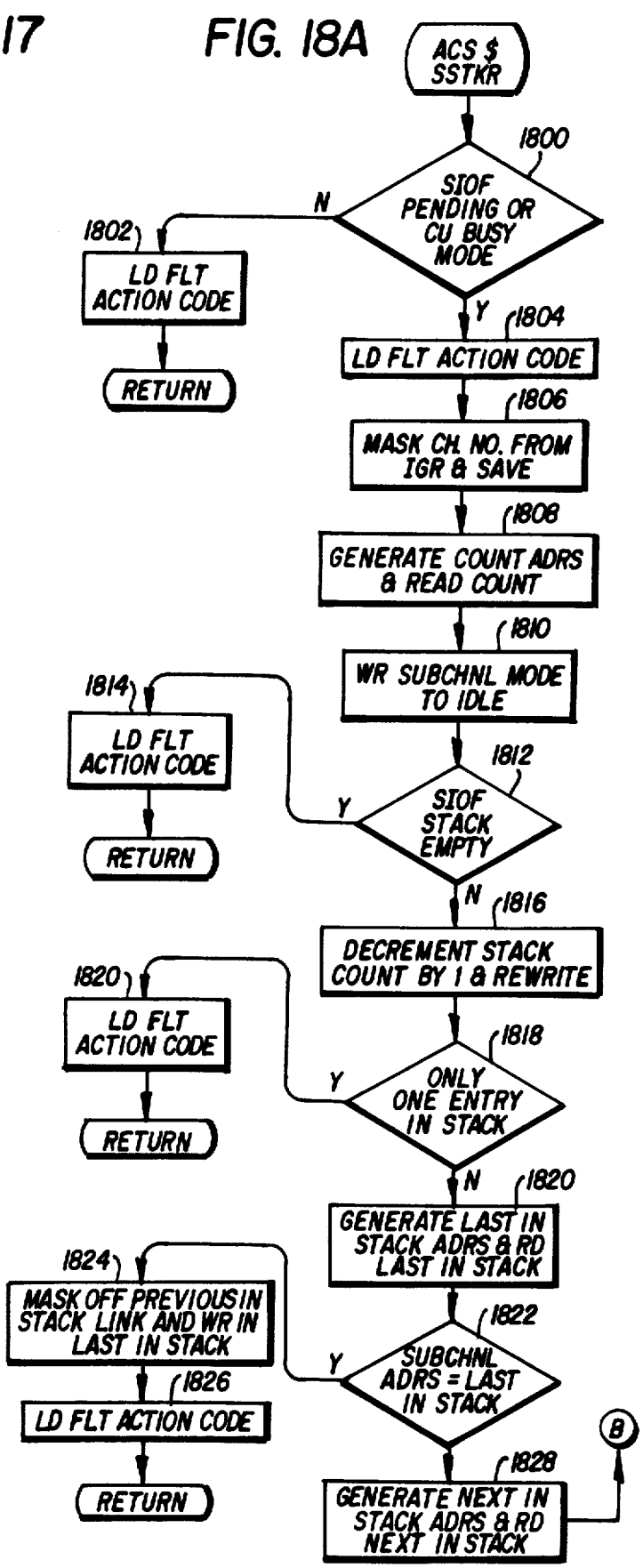

The SIOF Stack Relink Routine (ACS$SSTKR) is shown in FIGS. 18A and 18B. This routine assumes that IGR has been read by the caller. A check is made to guarantee that the channel is in SIOF pending or CU busy mode, and if not, the routine returns to the caller. If the subchannel is an SIOF pending mode, then the subchannel is removed from the SIOF stack, the pointers updated, the mode set to idle and a return made to the caller.

The routine begins at step 1800 in FIG. 18A. The subchannel mode latches 406 are tested to see if the subchannel is in SIOF pending or CU busy mode. If it is not, then a fault action code is loaded at step 1802 and the routine returns to the calling routine. If the subchannel mode is SIOF pending or CU busy then from step 1800 the routine moves to step 1804 to load a fault action code.

At step 1806 the channel number is read from the CMOD latches 410 and saved at address 660* in LS 504. At step 1808 the channel number is added to the constant 200* and the result used to address LS 504 to read out the SIOF stack count from table 1004. At step 1810 the subchannel address in the IGR Address Register 416 addresses the IGR array and a constant value of zero is applied to the array (see format of FIG. 8B) to write the subchannel mode field of the array to idle (0000).

At step 1812 the stack count read at step 1808 is tested to see if the SIOF stack is empty. If the stack is empty then the routine returns to the calling routine after loading a fault action at step 1814. On the other hand, if the test at step 1812 indicates that the SIOF stack is not empty then at step 1816 the stack count is decremented by one and rewritten into table 1004 in LS 504 using the count address generated at step 1808.

At step 1818 the decremented stack count is tested for a zero value. If the test proves true then the entry being removed is the only entry in the stack. A fault action code is loaded at step 1820 and a return is made to the calling routine. If the test at step 1818 indicates that there is more than one entry in the stack then the channel number is added to the constant 100* and the result used to address table 1002 in LS in order to obtain the subchannel address of the last SIOF in the stack. At step 1822 the last in stack subchannel address is compared with the current subchannel address read from the IGR address register 416. If the two are equal the program branches to step 1824. The saved channel number is added to the constant 100* to obtain an address in the last SIOF in stack table 1002 and the previous in stack link is written into this address. The previous in stack link is read from the data count field of the IGR array using the address read from the last in stack table.

If the comparison at step 1822 shows that the subchannel address is not equal to the last in stack address, the routine moves to step 1828 where the saved channel number is used to address LS 504 and read from table 1000 the subchannel address of the next SIOF entry in the stack. The routine proceeds to FIG. 18B where the entry read from the stack is compared with the subchannel address to see if they are equal. If they are equal, the program branches from step 1830 to step 1832 where the next in stack link is written into the next in stack table.

If the subchannel address is not equal to the next in stack address then at step 1834 the previous in stack link and next in stack link are obtained. At step 1836 the next in stack link is written to the previous in stack link subchannel and at step 1838 the previous in stack link is written to the next in stack link subchannel.

From step 1832 or 1838 the routine proceeds to step 1840 where the return address of the calling routine is retrieved from LS, and a return is made to the calling routine.

SUMMARY

In summary, it is seen that the present invention provides a method and apparatus for handling SIOF commands issued by a host processor for execution by peripheral subsystem control units. The SIOF commands are queued until a channel module connected between the CCM and the control units issues an SIOF request indicating that a channel is available through the CM. At this time the SIOF command is sent through the CM to the control unit. The CCM maintains a control unit busy queue for each channel and, when a control unit connected to a channel reports control unit end status the control unit busy queue is linked to the top of the SIOF pending queue so that the SIOF commands which could not be executed by the control units because they were busy may again be issued to those control units by the CCM without interrupting the central computer complex.

The embodiments of the invention in which an exclusive property or privilege is claimed are defined as follows:

1. A method of processing commands issued by a central computer complex to a central control module, said commands being passed from said central control module through channel module means to control units for execution thereby, said method comprising:
   forming a first queue of commands received by said central control module but not yet passed through said channel module means;
   forming a second queue of commands which have been passed through said module means but rejected by one of said control units because it is busy; and,
   linking said second queue to the top of said first queue when said one control unit is available to accept a command,
   whereby commands rejected by a control unit because it is busy may again be issued to said control unit without interrupting said central computer complex.

2. The method as claimed in claim 1 wherein said channel module means includes plural channels connecting said central control module to said control units, said method further comprising forming a said first and a said second queue for each of said channels.

3. In a data processing system including a central computer complex, a central control module, a subsystem control unit and channel module means connecting said central control module to said subsystem control unit, said central computer complex issuing start I/O fast (SIOF) commands to said central control module, said central control module including means for informing said channel module means that an SIOF command is available and said channel module means including means for requesting an SIOF and passing said STOF command on to said subsystem control unit, the improvement comprising:
   first means in said central control module for maintaining a first queue of SIOF commands which have been received from said central computer complex but have not been requested by said channel module means;
   second means in said subsystem control unit for generating a busy status indication when said subsystem is busy at the time it receives an SIOF command from said channel module means, said busy status indication being routed through said channel module means to said central control module;
   second means in said central control module for maintaining a second queue for SIOF commands which cannot be executed by said subsystem control unit because said unit is busy, and,
   third means for linking said second queue to the top of said first queue when said subsystem control unit is ready to accept an SIOF command.

4. The improvement as claimed in claim 3 wherein said data processing system includes plural subsystem control units and said channel module means comprises a plurality of channels selectively connecting said central control module to said subsystem control units,
   said first and said second means in said control module each including means for maintaining a separate queue for each of said channels; and,
   said third means including means for linking the second queue for a given channel to the top of the first queue for said given channel when a subsystem control unit connected to said channel is ready to accept an SIOF command.

5. A data processing system comprising:
   a central computer complex for issuing commands,
   a plurality of control units for controlling execution of said commands, each of said control units including means for generating control unit busy status when it is unable to execute one of said commands when it is received,
   a central control module for receiving said commands from said central computer complex,
   a plurality of channels selectively connecting said central control module to said control units,
   said central control module including,
   first means for selectively passing on to one of said channels an indication that a given command has been received for execution by said one channel; and,
   second means for forming, for each of said channels, a first queue of received commands which have not been passed on to said channels;
   said channels each including,
   means for issuing to said central control module a request for one of said commands when said channel is not busy;
   said central control module including means responsive to one of said requests from one of said channels for passing one of said commands from said first queue for said one channel to a control unit connected thereto;
   means in each said control unit for generating a control unit busy status in response to receipt of one of said commands which cannot be executed because the control unit is busy, said busy status being returned from said control unit to said central control module through one of said channels; and,
   means in said central control module responsive to said busy status for forming, for each of said channels, a second queue of the commands for which busy status was returned over the channel.

6. A data processing system as claimed in claim 5 wherein:
   each of said control units includes means for returning control unit end status over one of said channels when it is available to accept another command; and, said central control module includes means for linking said second queue for the channel over which said control unit end status was returned to the top of said first queue for the channel over which said control unit end status was returned.

7. A data processing system as claimed in claim 5 wherein a plurality of said control units are daisy chained to one of said channels.

* * * * *

UNITED STATES PATENT AND TRADEMARK OFFICE
CERTIFICATE OF CORRECTION

PATENT NO. : 4,546,430

DATED : October 8, 1985

INVENTOR(S) : David J. Moore, Larry L. Byers, Duane G. Kurth, Donald T. Bordsen, John R. Honkomp, Bruce C. Todd, & Robert M. Malek It is certified that error appears in the above-identified patent and that said Letters Patent is hereby corrected as shown below:

In the Claims:

Colume 29, Line 61, change "STOF" to -- SIOF --.

Signed and Sealed this

Thirty-first Day of December 1985

[SEAL]

Attest:

Attesting Officer

DONALD J. QUIGG

Commissioner of Patents and Trademarks